United States Patent [19]

David

[11] Patent Number: 4,653,273
[45] Date of Patent: Mar. 31, 1987

[54] SINGLE FREE-PISTON EXTERNAL COMBUSTION ENGINE WITH HYDRAULIC PISTON DETECTION

[76] Inventor: Constant V. David, 4952 Field St., San Diego, Calif. 92110

[21] Appl. No.: 780,961

[22] Filed: Sep. 27, 1985

Related U.S. Application Data

[62] Division of Ser. No. 586,812, Mar. 6, 1984, Pat. No. 4,561,252.

[51] Int. Cl.$^4$ ............................................. F02B 71/04
[52] U.S. Cl. .................................... 60/595; 123/46 A
[58] Field of Search .............. 60/595; 123/46 R, 46 A

[56] References Cited

U.S. PATENT DOCUMENTS

| | | | |
|---|---|---|---|
| 1,620,565 | 3/1927 | McKeown | 123/46 A |
| 1,858,102 | 5/1932 | McKeown | 123/46 A |
| 2,595,396 | 5/1952 | Lee | 60/595 X |
| 2,814,551 | 11/1957 | Broeze et al. | 123/46 A X |
| 2,943,610 | 7/1960 | Foster | 60/595 X |
| 3,365,879 | 1/1968 | Panhard | 60/595 |
| 4,399,654 | 8/1983 | David | 60/595 |

FOREIGN PATENT DOCUMENTS 208150 10/1924 United Kingdom .................. 60/595

*Primary Examiner*—Michael Koczo

[57] ABSTRACT

A free piston combustion chamber coupled to air compression and gas expansion chambers are combined with a rotary motor. The rotary motor shaft drives the air compressor, receives power from the expanding gases in the expansion chamber and provides residual torque and power for external use. Two combustion chambers located at each end of the free piston receive compressed air and fuel for combustion outside of the rotary motor assembly. The motion of the free piston between the two combustion chambers is independent of the motor rotary motion. The air admission inside the combustion chambers, the fuel injection and the combustion initiation process are all controlled and timed by the free piston movement back and forth. A heat exchanger is located between the combustion-chamber/-free-piston assembly and the rotary motor. The compressed air exiting from the compression chamber is heated by the gases exiting from the combustion chambers, before they are admitted into the expansion chamber of the rotary motor. The heat exchanger also performs the function of a pressurized pressure vessel or reservoir to smooth out pressure surges in the compressed air or gases entering or leaving the combustion chambers. The power output of the rotary motor is determined by the control of the amount of air or of the amount of fuel admitted in the combustion chambers. Air and fuel admissions can also be controlled simultaneously in a programmed manner. The two combustion chambers can also be formed alternatively by two oscillating free pistons guided inside a quasi torodoidally shaped containing structure.

13 Claims, 65 Drawing Figures

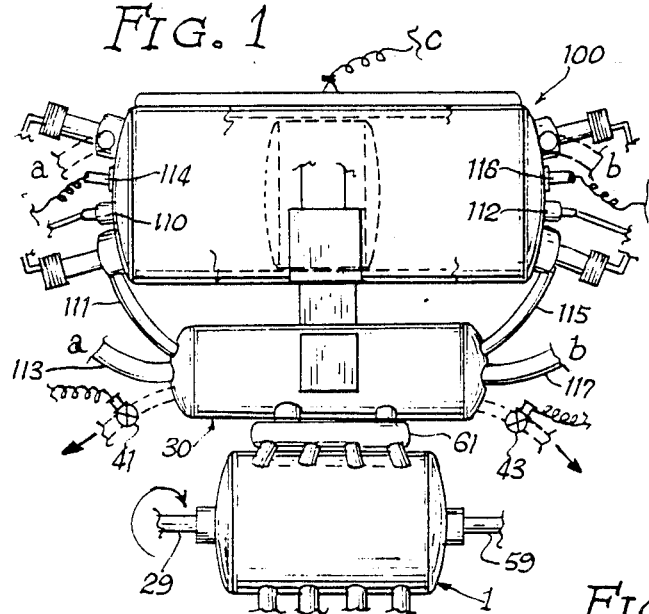
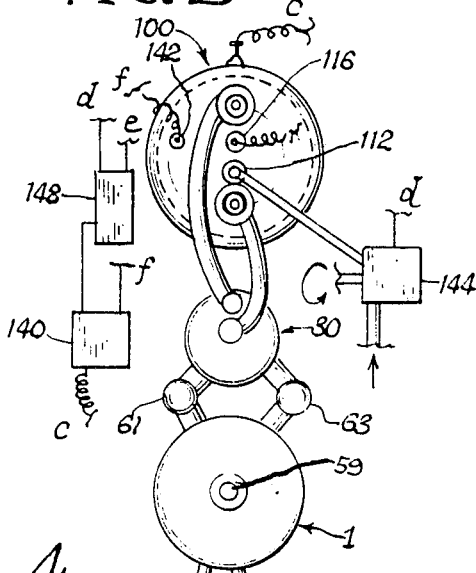
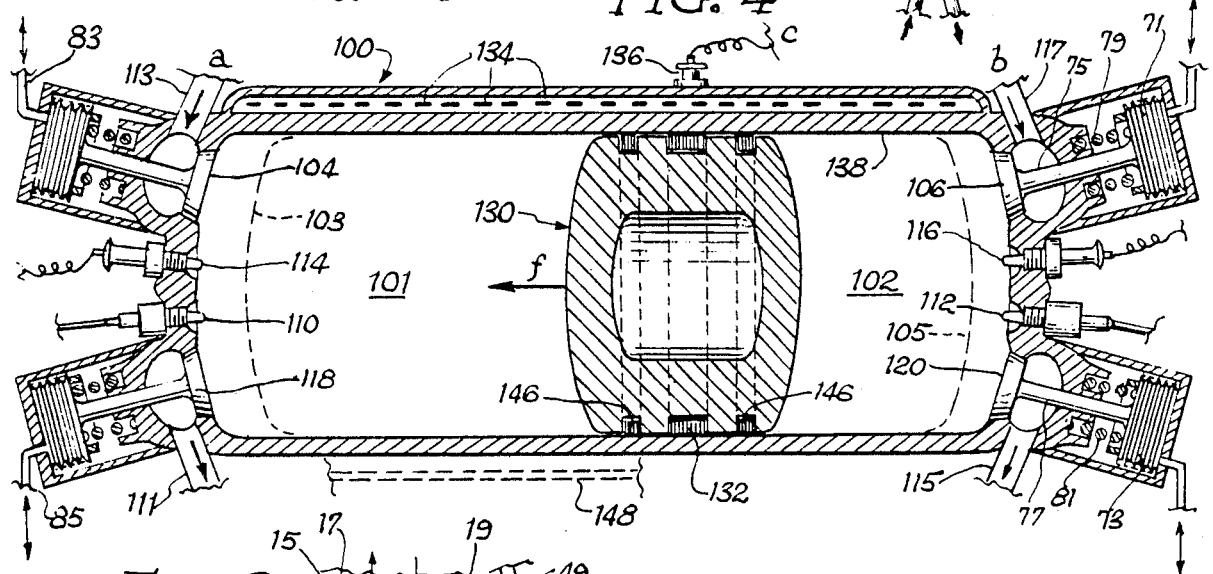
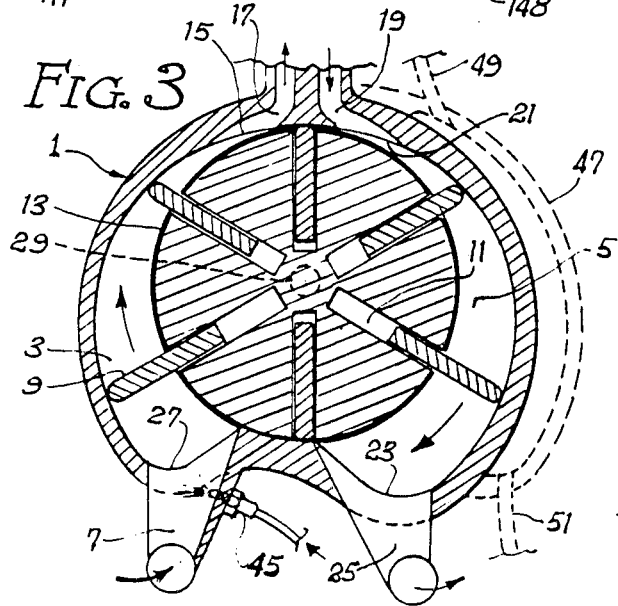
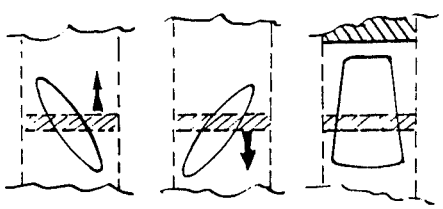
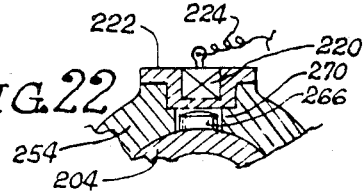

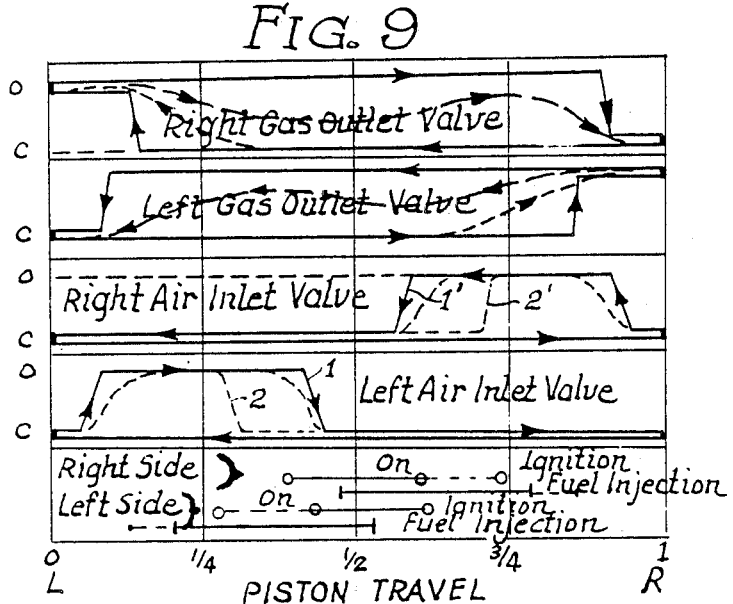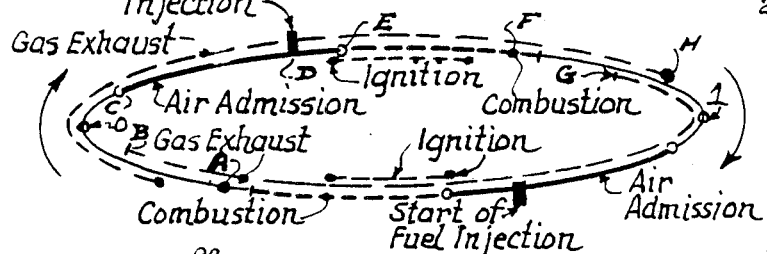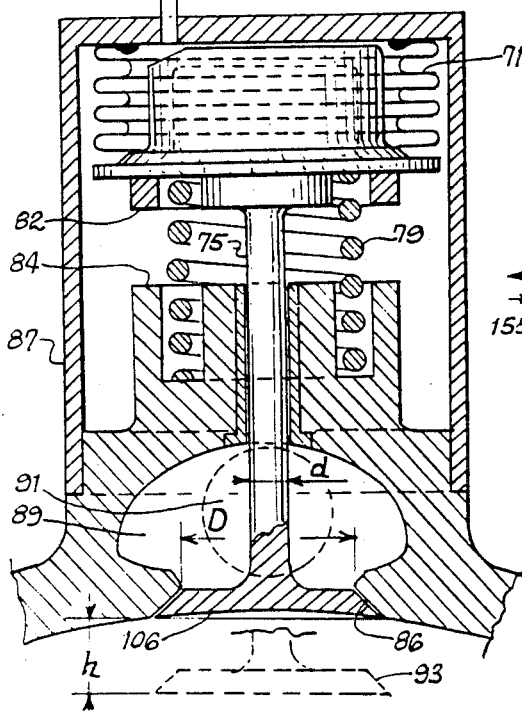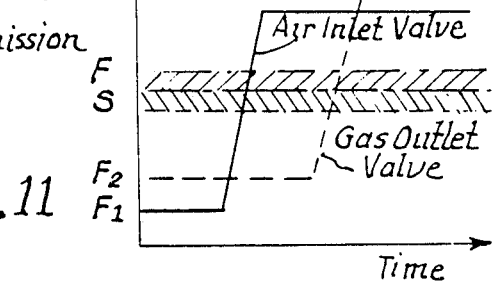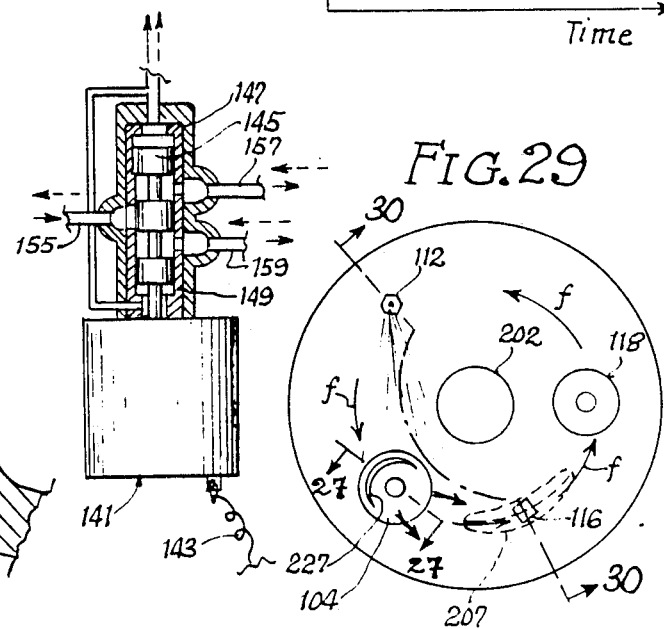

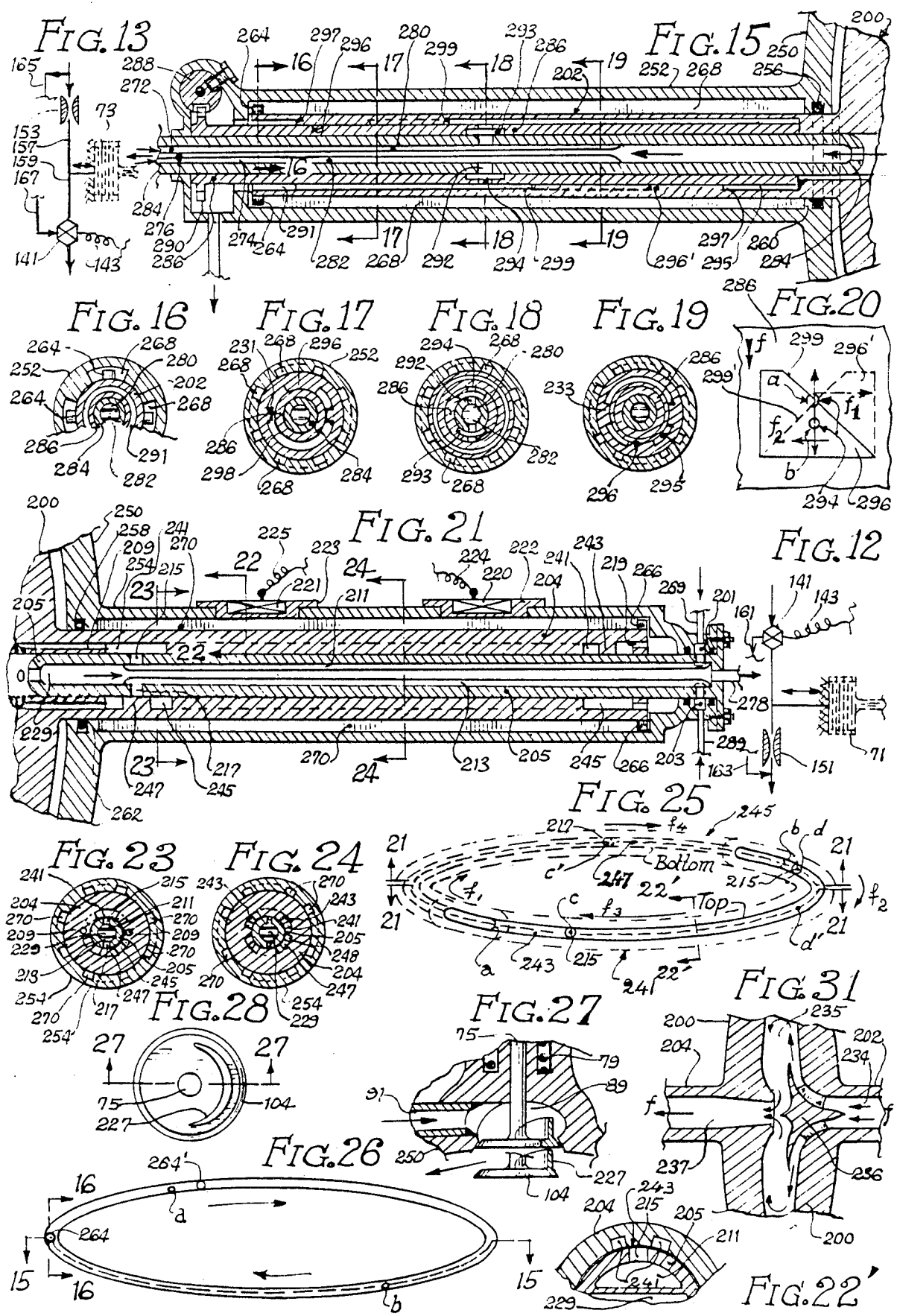

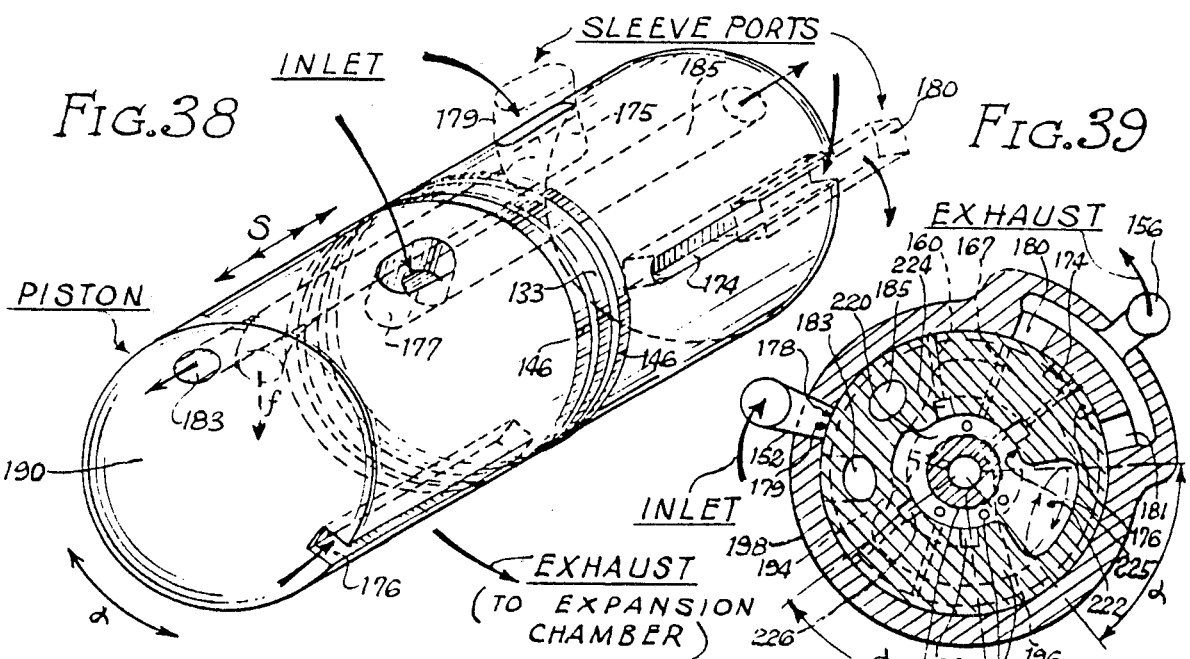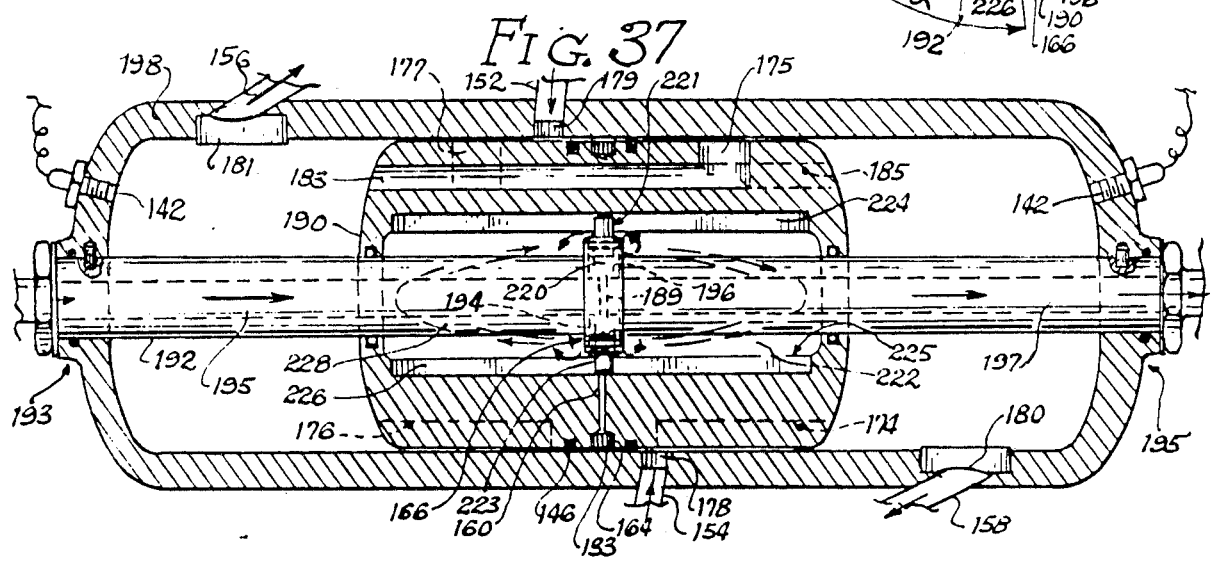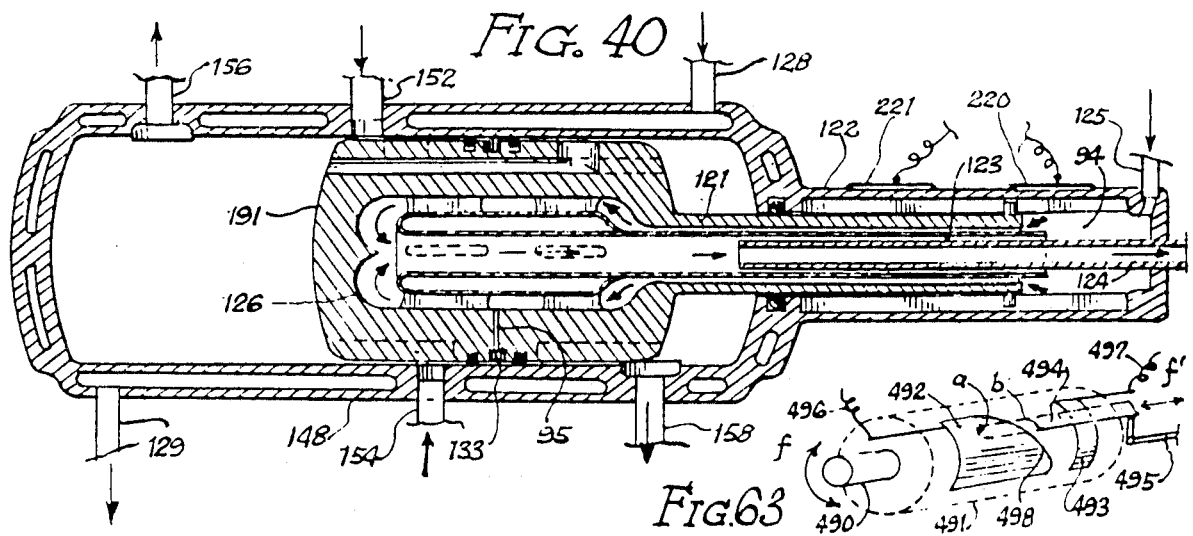

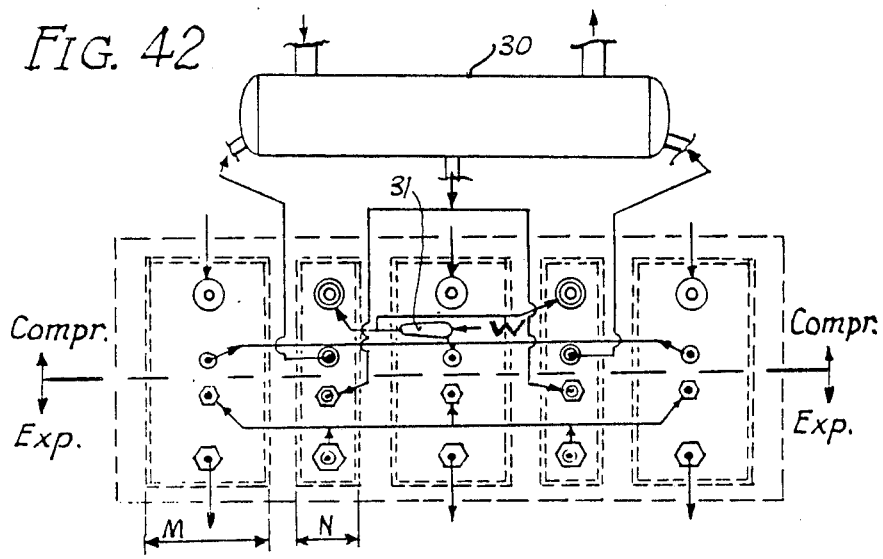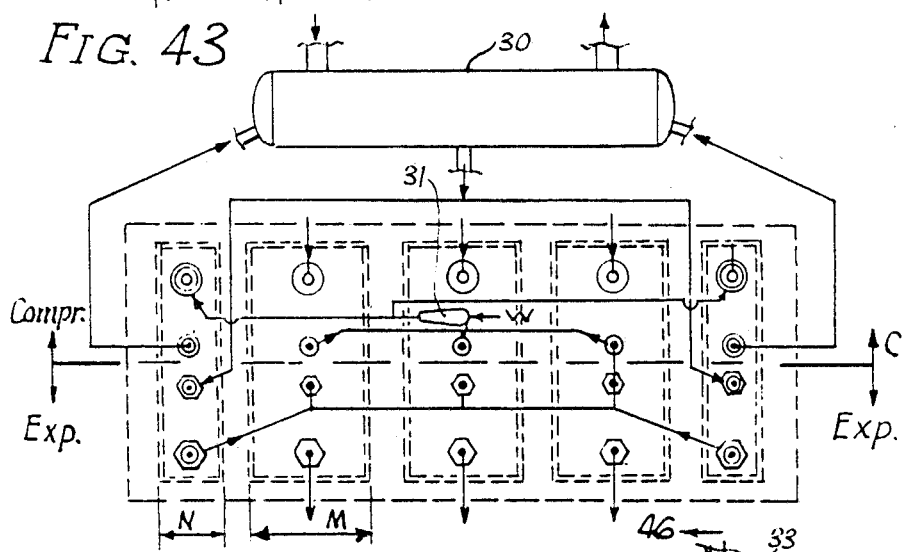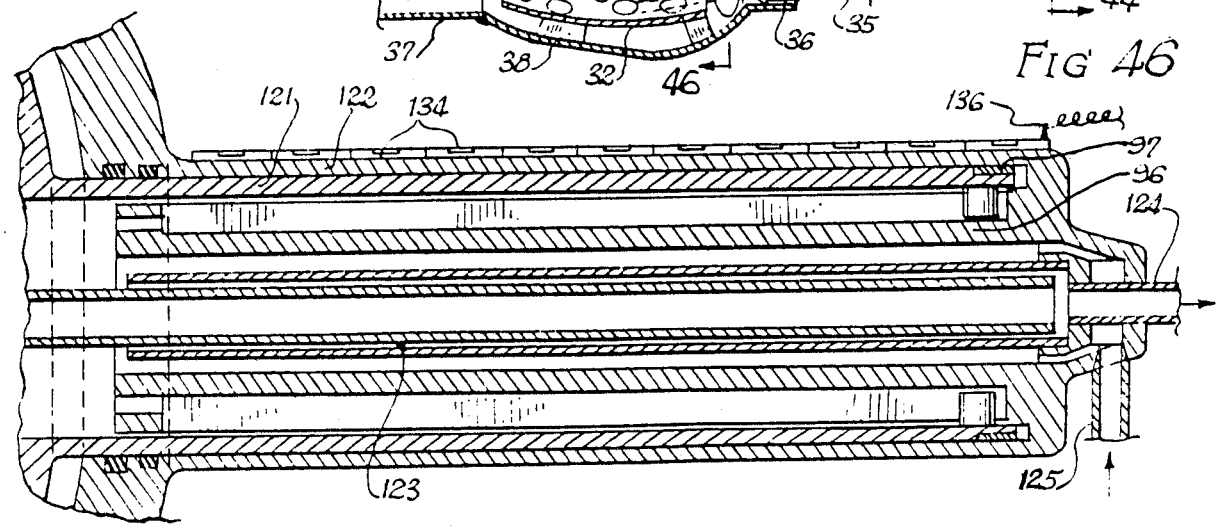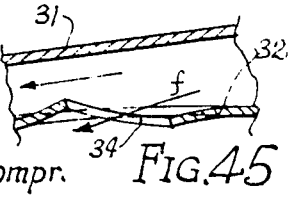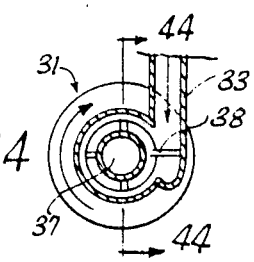

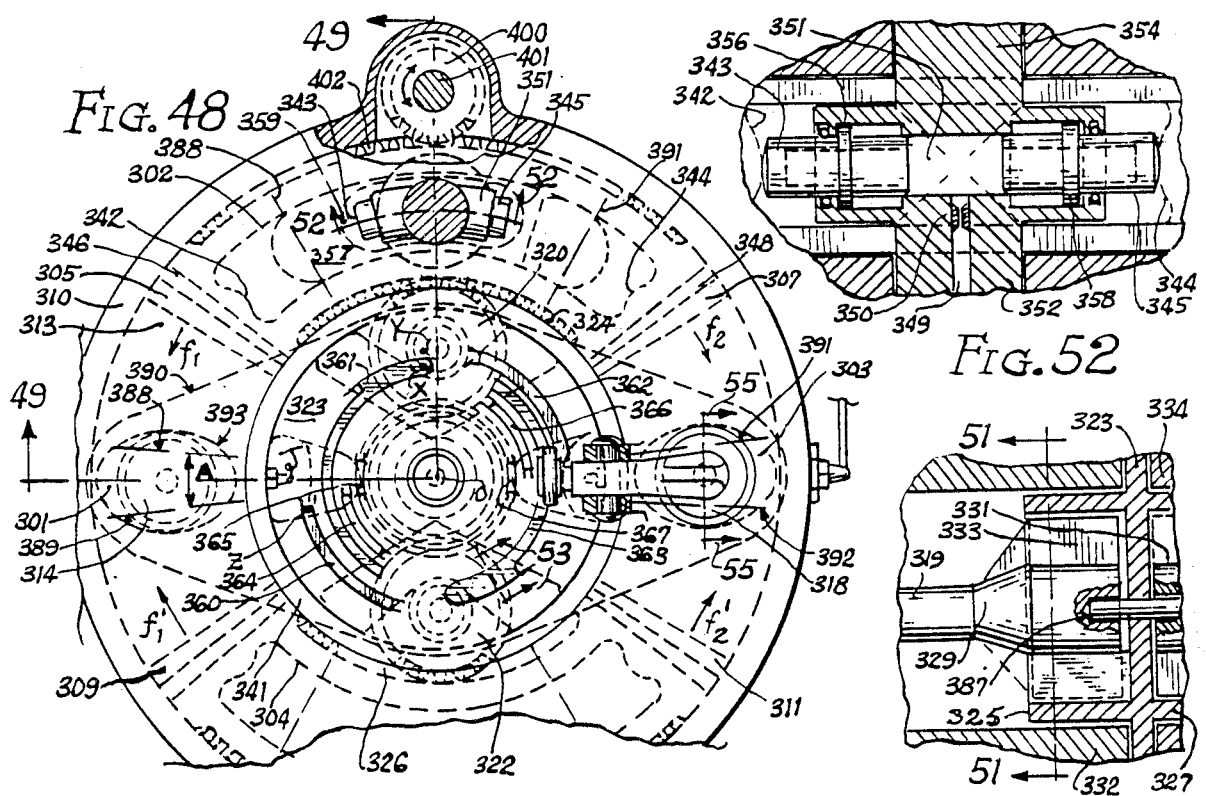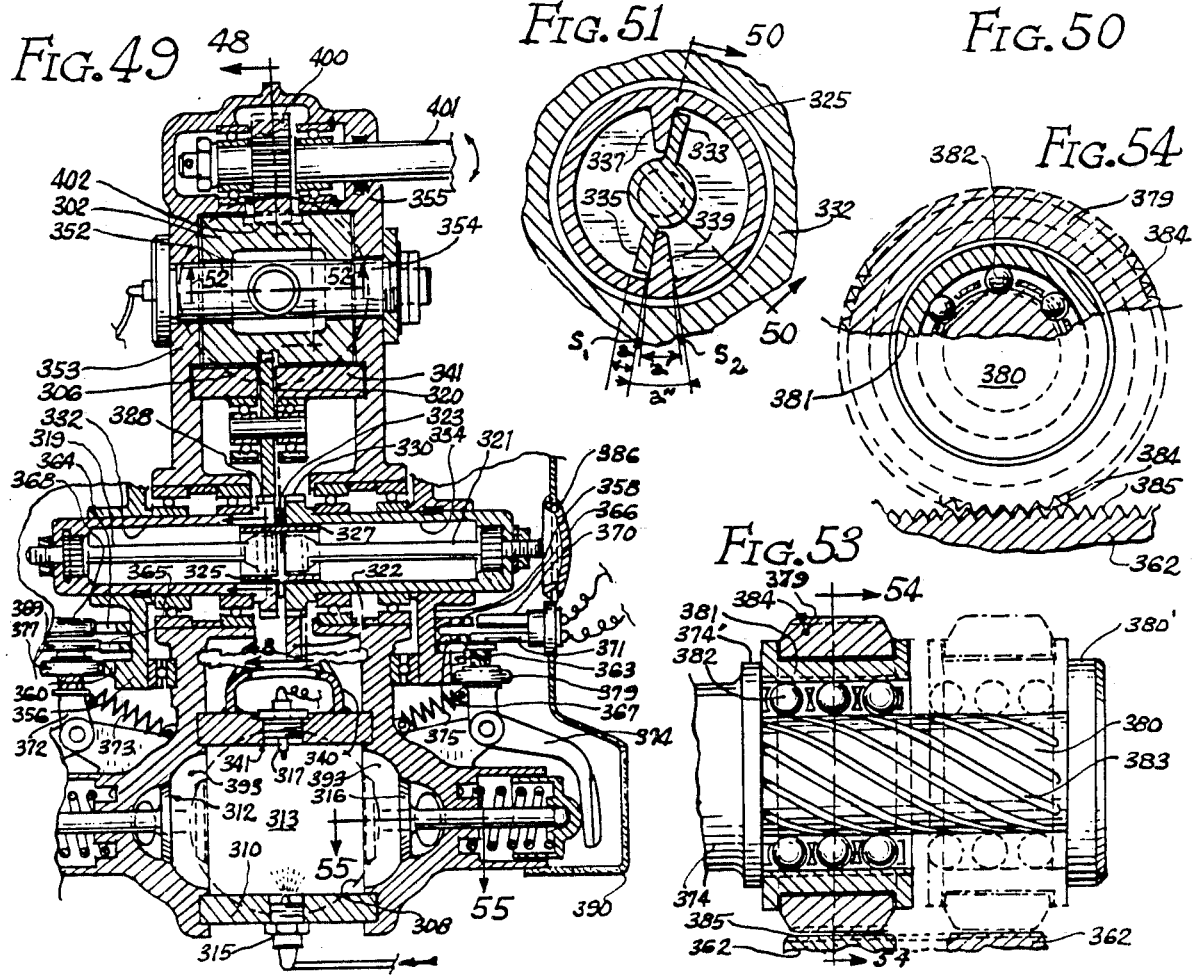

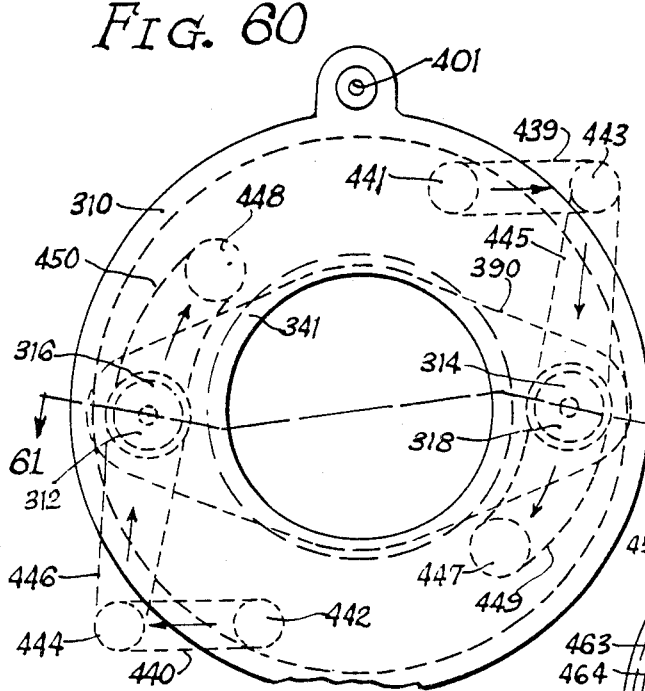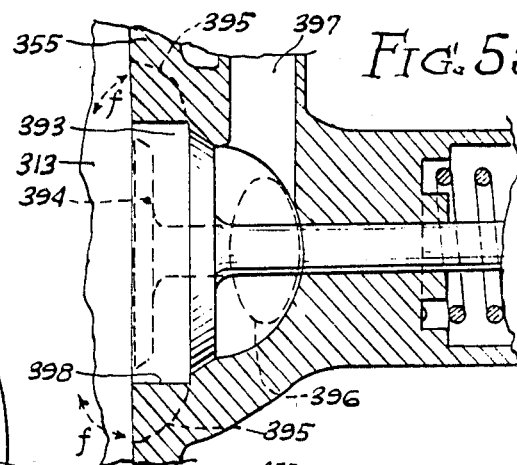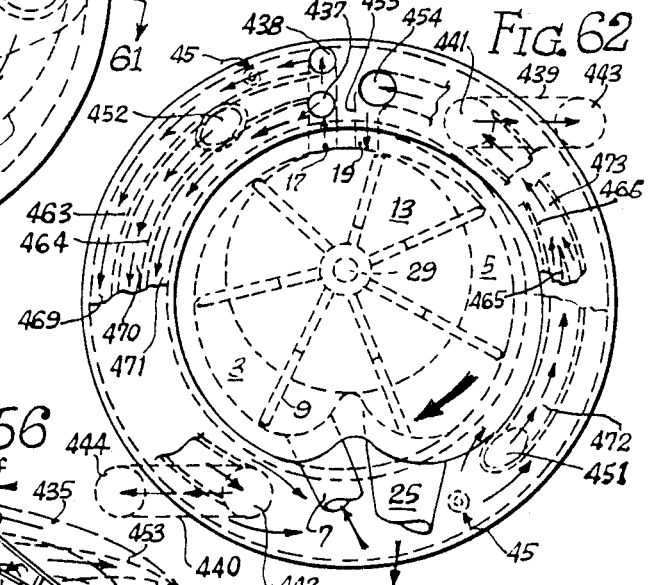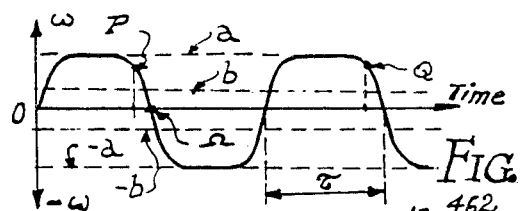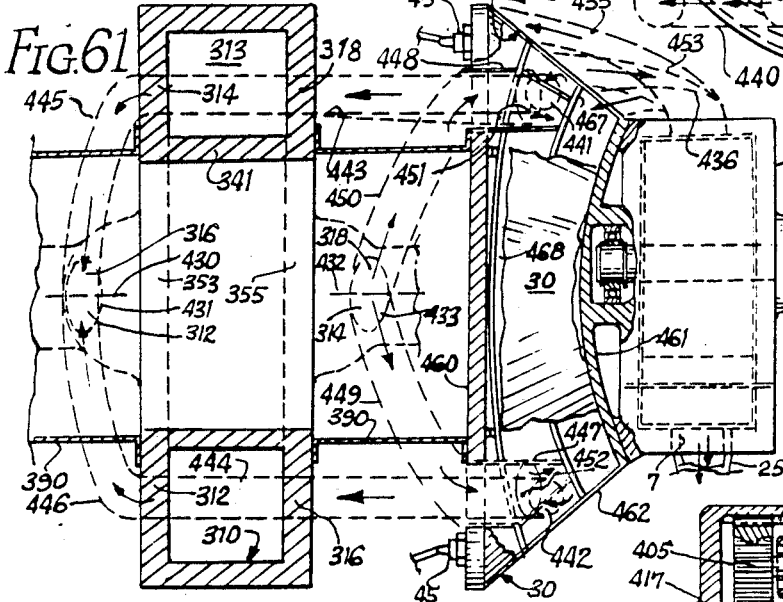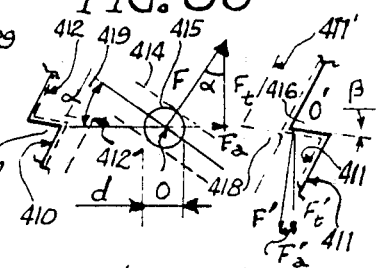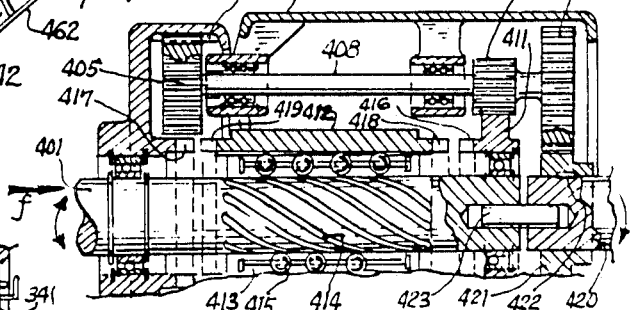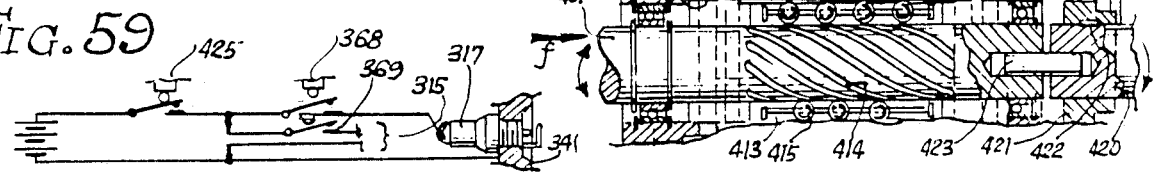

SINGLE FREE-PISTON EXTERNAL COMBUSTION ENGINE WITH HYDRAULIC PISTON DETECTION

CROSS-REFERENCE TO RELATED APPLICATION

This Application is a division of my prior U.S. patent application Ser. No. 586,812, filed Mar. 6, 1984, and entitled EXTERNAL COMBUSTION ENGINE now U.S. Pat. No. 4,561,252.

BACKGROUND OF THE INVENTION

The present invention relates to an external combustion engine that combines the advantages of different types of piston and rotary engines into a single construction.

Conventional engines present significant cooling problems. Further, each type of engine, such as Otto Cycle, Diesel and gas turbine, is limited in its design possibilities by its principle of operation and its lack of flexibility in component arrangement. Particular fuels must be used for example.

Diesel and Otto Cycle engines produce undesirable vibrations and low frequency noise. Diesel engines require high compression ratios and are difficult to start. The typical engine requires a large number of complex moving parts. As a result, such engines are also heavy and bulky. Gasoline type internal combustion engines require highly volatile fuels. Although much lighter and less particular fuel-wise, turbine engines generate high pitch noises and require expensive and complicated fuel control mechanisms. They are not practical for the power ranges needed for compact cars or that are less than 150 HP.

Efforts are continuously being made to develop new engines that are more efficient and less expensive to manufacture and operate. Recently, efforts on a large scale with rotary engines are evidence of these continuing efforts.

In view of this background, it is an object of the present invention to provide a new and improved combustion engine that combines the best features of different types of engines to produce an effective power plant that will operate equally well with various types of fuels.

It is another object of the present invention to provide a slower combustion to enhance combustion efficiency, to minimize air pollution with exhaust products and allow the use of less expensive, less volatile and of possibly non-fossil fuels such as methanol.

It is another object of the present invention to produce an improved power plant that is simple in construction with few moving parts and that lends itself to production techniques at relatively low cost.

It is another object of the present invention to provide a new and improved type of engine that runs smoothly and that has low noise and vibration levels.

It is another object of the present invention to provide a new and improved power plant that offers flexiblity in design to accomplish varying objectives of efficiency in fuel consumption, weight and space reductions.

It is another object of the present invention to provide a new and improved engine that has low friction losses and can be easily and efficiently cooled.

It is another object of the present invention to provide a new and improved power plant wherein a heat echanger can be simply added to facilitate cooling and to increase efficiency.

It is another object of the present invention to provide a new and improved engine wherein the motor member and the combustion member are mechanically segregated to allow the use of most optimum materials for the construction of the parts of each of these two members.

It is another object of the present invention to provide a new and improved power plant wherein the overall reliability is enhanced, the maintenance made easier and repair work rendered less complex and less expensive.

It is another object of the present invention to provide a new and improved engine wherein the vibrations transmitted to the engine mountings and the power shaft are minimized.

SUMMARY OF THE INVENTION

The above objects are retained by an external combustion engine utilizing an engine member including compression means in communication with separate external combustion means. The gases resulting from the combustion are passed from the combustion means into the expansion means to provide the compression means driving power and also useful shaft output power.

Accordingly, the present invention provides an engine in which the four principal functions: air compression, fuel combustion, heat exchange and gas expansion; are physically segregated. The combustion process is temporally independent from the operation of the air compression and power extraction means. The power drive and the piston are not mechanically connected. The regimes of operation of the fuel combustion process and of the power production process are fully independent of one another. This gives more time to the combustion to take place and to be more complete, as compared to conventional combustion engines. There are no side loadings applied on the piston.

DESCRIPTION OF THE DRAWINGS

FIG. 1 is a side elevation of the single piston version of the external combustion engine of the present invention.

FIG. 2 is an end view of the external combustion engine shown in FIG. 1.

FIG. 3 is a midsectional elevation of the engine member of the external combustion engine of the present invention.

FIG. 4 is a longitudinal midsectional view of the sleeve, combustion chambers and free piston of the combustion member of the external combustion engine of the present invention.

FIG. 5 is an enlarged view of an inlet port to the compression chamber of the engine section shown in FIG. 3.

FIG. 6 is an enlarged view of an outlet port from the expansion chamber of the engine section shown in FIG. 3.

FIG. 7 is an enlarged view of the compression chamber outlet and of the expansion chamber inlet ports of the engine section shown in FIG. 3.

FIG. 8 is an enlarged sectional view of a typical inlet (or outlet) valve and of its actuation means shown in FIG. 4.

FIG. 9 is a timing diagram pertaining to the opening and closing sequences of the combustion member valves, and of fuel injection and ignition means operating sequences.

FIG. 10 illustrates the manner in which the combustion member valves, the fuel injection and the ignition means are sequenced, as shown in FIG. 9, when the sequencing is initiated by a combination of the axial and rotational motions of the free piston inside the sleeve.

FIG. 11 is a midsectional elevation of the control valve used to monitor the opening and closing of the inlet and outlet valves of the combustion member.

FIG. 12 is a schematic view of the arrangement of the control valve and inlet valve of the combustion member.

FIG. 13 is a schematic view of the arrangement of the control valve and outlet valve of the combustion member.

FIG. 14 illustrates the manner in which the forces acting on the inlet and outlet valves are applied chronologically.

FIG. 15 is a midsectional elevation of the timing appendage of the free piston and used to control the inlet valve of the combustion member.

FIG. 16 is a section taken along line 16—16 of FIG. 15.

FIG. 17 is a section taken along line 17—17 of FIG. 15.

FIG. 18 is a section taken along line 18—18 of FIG. 15.

FIG. 19 is a section taken along line 19—19 of FIG. 15.

FIG. 20 illustrates the manner in which the sleeve and the land of the hydraulic control valve of the appendage shown in FIG. 15 cooperate during the axial and rotational movements of the free piston in order to monitor air inlet valving.

FIG. 21 is a midsectional elevation of the timing appendage of the free piston and used to control the outlet valves of the combustion member.

FIG. 22 is a partial section taken along line 22—22 of FIG. 21.

FIG. 22' is a partial section taken along line 22'—22' of FIG. 25.

FIG. 23 is a section taken along line 23—23 of FIG. 21.

FIG. 24 is a section taken along line 24—24 of FIG. 21.

FIG. 25 illustrates the manner in which the hydraulic monitoring of the outlet valves of the combustion member is coordinated with the axial and rotational movements of the piston.

FIG. 26 illustrates the manner in which the free piston location is detected.

FIG. 27 is a partial midsectional elevation of an inlet valve of the combustion member shown with an air deflector attached and taken along line 27—27 of FIGS. 28 and 29.

FIG. 28 is an end view of an inlet valve equipped with an air deflector.

FIG. 29 is an end view, as seen from inside a combustion chamber, of the combustion member.

FIG. 30 is a developed sectional view taken along line 30—30 of FIG. 29.

FIG. 31 is a partial midsectional elevation of the center part of the free piston and showing the channelling of the cooling oil inside the piston.

FIG. 32 is an assemblage of fragmented midsectional views of the free piston and its two appendages.

FIG. 33 is a section taken along line 33—33 of FIG. 32.

FIG. 34 illustrates an alternate manner in which the free piston can move axially and rotationally inside the combustion member sleeve.

FIG. 35 is a block diagram illustration of the operation of the external combustion engine of the present invention in which the free piston location is detected externally.

FIG. 36 is a block diagram illustration of the operation of the external combustion engine of the present invention in which the free piston location is detected by means of the appendages attached to the free piston.

FIG. 37 is a midsectional elevation of a combustion member assembly in which the free piston has no appendage and is guided internally and in which the inlet and outlet valving is performed by the free piston itself.

FIG. 38 is a perspective view of the external surface of the free piston shown in FIG. 37 showing the inlet and outlet valving arrangement.

FIG. 39 is a section of the combustion member and of the free piston taken midway between the two combustion chambers.

FIG. 40 is a midsectional elevation of a combustion member assembly in which the free piston is equipped with only one appendage and in which the inlet and outlet valving is performed by the free piston which is then externally guided.

FIG. 41 is an enlarged midsectional elevation of an alternate configuration of the free piston appendage shown in FIG. 40.

FIG. 42 is a block diagram illustration of the operation of the external combustion engine of the present invention and equipped with water injection means located between the first and second stage compression means.

FIG. 43 is a block diagram illustration of the operation of the external combustion engine of the present invention and in which all the first stages are sandwiched between the second stages of the compression and expansion means.

FIG. 44 is a midsectional elevation of the water injection means taken along line 44—44 of FIG. 46.

FIG. 45 is an enlarged part of the sectional view shown in FIG. 44.

FIG. 46 is a section taken along line 46—46 of FIG. 44.

FIG. 47 is an engine efficiency chart showing a performance comparison between the external combustion engine of the present invention and a conventional piston engine at various power levels.

FIG. 48 is a plan view of an alternate configuration of the combustion member of the present invention which incorporates two free pistons oscillating in a circular manner.

FIG. 49 is a developed midsectional elevation of the combustion member of FIG. 48 taken along line 49—49 of FIG. 48.

FIG. 50 is a partial section of the connection between the two torsion bars of FIG. 49 and which synchronize the motions of the two free pistons.

FIG. 51 is a section taken along line 51—51 of FIG. 50.

FIG. 52 is a developed partial section taken along lines 52—52 of FIGS. 48 and 49.

FIG. 53 is a midsectional side elevation of a typical cam-roller arrangement used to actuate the inlet and outlet valves of the combustion member shown in FIGS. 48 and 49.

FIG. 54 is a section taken along line 54—54 of FIG. 53.

FIG. 55 is a partial section taken along lines 55—55 of FIGS. 48 and 49.

FIG. 56 is a chart of the angular velocity of the takeout power shafts connected to the two free pistons.

FIG. 57 is a partial midsectional elevation of the rotation inverter connected to the takeout power shafts.

FIG. 58 illustrates the directions of the forces and motions imparted by the ratchet teeth of the rotation inverter.

FIG. 59 illustrates the electrical connections and switches used to monitor the ignition system of the combustion member shown in FIGS. 48 and 49.

FIG. 60 is a simplified plan view of the inlet and outlet ducting between the combustion member shown in FIGS. 48 and 49, the heat exchanger and the engine (motor) of the present invention.

FIG. 61 is a developed section taken along line 61—61 of FIG. 60.

FIG. 62 is an end view of the two-free-piston configuration of the combustion member shown in FIGS. 60 and 61.

FIG. 63 is a schematic perspective view of the fuel injection timing device used in conjunction with the combustion member of the present invention shown in FIGS. 60, 61 and 62.

FIG. 64 is a legend of symbols utilized in the schematic diagrams of FIGS. 35 and 36.

FIG. 65 is a legend of symbols utilized in the schematic diagrams of FIGS. 42 and 43.

DETAILED DESCRIPTION OF THE INVENTION

Referring to FIGS. 1, 2, 3 and 4 of the drawings, the external combustion engine of the present invention generally comprises an engine 1 coupled with a heat exchanger 30 and a free piston combustion member 100. The engine compresses the air in a compression chamber 3 and channels it to heat exchanger 30. From the heat exchanger, the air passes to either one of the two combustion chambers 101 and 102 located at each end of combustion member 100, depending upon the inlet valves 104 and 106 positions. The two combustion chambers are separated by a free sliding piston 130. Upon combustion of the fuel injected by means of fuel injectors 110 and 112, ignited by spark plugs 114 and 116, the combusted gases leave the combustion chamber through oulet valves 118 and 120. The gases then enter heat exchanger 30 where heat is exchanged between the combusted gas and the compressed air. The gases then leave heat exchanger 30 to be admitted into the engine expansion chamber 5 in which it expands back to atmospheric pressure.

Air is admitted into the compression chamber through inlet duct 7, compressed by the displacement of a plurality of vanes 9 guided inside channels 11 inside a rotor 13 rotating in the direction of the arrows shown in FIG. 3. The air entrapped between the vanes is forced to occupy a smaller and smaller volume as the vanes move, thereby being compressed until the leading vane uncovers opening 15 connected to compression member outlet 17. The combusted gas leaving the heat exchanger enters the engine through admission duct 19 and enters the expansion chamber 5 through opening 21. As the rotor-vane assembly rotates clockwise, in the configuration shown, the volume occupied by the gas entrapped between two vanes increases and the gas inside that volume expands until opening 23 becomes uncovered by the leading vane, at which time, the expansion chamber vents to the atmosphere through exhaust duct 25 and the combusted gas leaves the engine. The expansion chamber is generally larger than the compression chamber and the mean pressure inside the expansion chamber is generally higher than inside the compression chamber. The result is more energy generated by the expansion member than is absorbed by the compression member. The energy difference is available on the rotor shaft 29 as useful power.

The engine may have additional features as illustrated in FIGS. 1 and 3 in phantom lines. Some or all of the excess power referred to above can be extracted by bypassing compressed air or combusted gases for direct use separately from the engine by means of bypass valves 41 and 43 that may be controlled manually or electrically, automatically or at will as desired. The air compression efficiency, and thereby the engine overall efficiency, can be increased by injecting water or a water/methanol mixture inside the air inlet duct 7, by means of injector 45. The expansion chamber side of the engine is constantly exposed to hot gas and may need external cooling. This is achieved by means of a water cooling jacket 47, in which cold water enters through pipe 49 and exits through pipe 51. FIGS. 5 and 6 show how the openings 23 and 27 are shaped so as to provide continuous support to the sliding ends of vanes 9 as they become uncovered. FIG. 7 shows the shape of openings 15 and 21. The collecting ducts 61 and 63 shown in FIG. 2 facilitate the passing of compressed air and combusted gas between the engine and the heat exchanger, whenever the engine comprises two or more segments, such as that illustrated in FIG. 3, sandwiched together so as to keep the vane length-to-width ratio within the reasonable limits required for a satisfactory operation of the engine, even though the engine total length may be larger than its diameter. Each engine segment is separated from the next by a plate that may or may not provide intersegmental cooling and lubrication means. All rotors in all engine segments are mounted on one single shaft. The end of this shaft, opposite to the power shaft 29, is for driving accessories or receiving the starting torque needed to initiate the engine operation.

In FIG. 4, the free piston inside the combustion member has no direct physical connection with the exterior of the combustion member. However, the opening and closing of valves 104, 106, 118 and 120 must be synchronized with the free piston motion at any and all times. Free piston 130 is equipped with a ring 132 made with a material most suitable for detection. The combustion member is equipped with a plurality of sensors 134 connected to electrical pickup lead 136. The sensing mode used to detect the position of ring 132 may be of magnetic or sonic nature, depending upon the material used in the construction of the free piston and the combustion member wall. When the combustion chamber wall is made of non-ferrous materials, magnetic means can be used and ring 132 is made of magnetic material. Otherwise, ultra sounds can be used and ring 132 can be made of a material with a sound impedance much different from that of the combustion member wall. In any case, the passing of ring 132 in front of a sensor 134 causes a signal to be generated. It is sent to a master control 140 in which the free piston position is then constantly monitored and the piston instant velocity calculated. At the same time, a pressure sensor 142 mounted on the combustion chamber end wall senses the pressure inside the combustion chamber. That signal is also sent to master control 140 where that information is monitored and processed. The letters a, b, c, d, e and f indicate how the various ducts, electrical and fuel lines shown in FIGS. 1, 2 and 4 are interconnected. From the data processed by master control 140, signals are sent from master control 140 to synchronization box 148 where the various signals for fuel injection initiation, spark plug energizing, valve closing and opening, timing, sequencing and duration of fuel injection are originated. A fuel injection pump 144 driven by shaft 59 feeds fuel to the injectors. Gas leakage between the two combustion chambers is minimized by means of rings 146 mounted on the free piston, on both sides of ring 132. The combustion member wall can be cooled by means of a water jacket if and where desired.

The valves shown in FIG. 4 are actuated by bellows 71 and 73 pressurized internally with a fluid such as oil. One face of these bellows is fixed and solidly connected to the combustion member structure. The other face is connected to the valve stem 75. A compression spring 79 maintains the valve on its seat and closed when the pressure inside the bellows is low. When the pressure is high, the bellows free face moves to push the valve open. Each bellows is connected to the oil pressure source by tubes 83 and 85. The double arrows of FIG. 4 correspond to the flow of oil as the high or low pressures are applied. A typical valve is shown in detail in FIG. 8 with the valve closed. With bellows 71 pressurized, stop 82 contacts stop 84 and the valve travels an amount h. The valve assumes the open position 93 depicted by a phantom line outlining the valve. The valve seat 86 offers a passage to air or gas of area $\pi(D^2-d^2)/4$ as seen in FIG. 8. The lateral air passage $\pi$ Dh should be at least equal to $\pi(D^2-d^2)/4$. With d small with respect to D and therefore negligible, h should be at least equal to D/4. When valve 106 is open, the combustion chamber communicates with valve chamber 89 that vents into ducts 91. The bellows assembly is contained in and mounted on a valve housing 87 attached to the combustion chamber wall. The sequence of valve openings and closings is depicted in FIGS. 9 and 10, where the timing and duration of fuel injection and spark plug activation is also shown. The positions (O for open and C for closed) assumed by the four valves are indicated as a function of piston travel from the left side of the combustion chamber to the right side, and then back. The starting point of a typical cycle is shown by point O on the thin line ellipse of FIG. 10 and the end of one stroke is designated as point 1. L is for left side and R is for right side in FIG. 9 so as to correspond to the left hand and right hand sides of FIG. 4. In FIG. 10, the piston motion is illustrated as imagining one point of reference on the piston describing or following an imaginary ellipse for ease of understanding, as though the piston were subjected to an oscillating lateral motion synchronized with its longitudinal travel. As seen from examining FIGS. 9 and 10, it is apparent that the two air inlet valves are never open at the same time, but the gas outlet valves are sometimes open at the same time. This is required to supply gas to the engine at a rate and pressure as even as possible. However, the gas outlet valves are never both closed at the same time, as a corollary result. For this reason, the controls of the air inlet and gas outlet valves are different, but such that only one control valve is needed for each set of air inlet valves and gas outlet valves.

The oil pressure inside all valve bellows is monitored by a control valve such as shown in FIG. 11. The control valve 141, actuated when electrical line 143 is energized, has 3 positions: neutral (position shown by pilot valve 145 in FIG. 11), up (when pilot valve 145 moves to stop 147) and down (when pilot valve 145 moves to stop 149). In the neutral position of pilot valve 145, control valve 141 is not energized; in the up and down positions, control valve 141 is energized, but with an inversion of polarity, in one instance as compared to the other. The arrows of FIG. 11 are shown either in solid line or in dotted line. The direction of the arrows indicate how oil pressure is applied to or from the control valve. The solid line arrows refer to the use of such a control valve to monitor the air inlet valves. The dotted line arrows refer to the use of such a control valve to monitor the gas outlet valves. In both cases, a hydraulic potentiometer is used by means of a restricting orifice as shown in FIGS. 12 and 13. FIG. 12 pertains to the actuation of the air inlet valves and FIG. 13 pertains to the actuation of the gas outlet valves. In FIG. 12, the oil passing through the restricting orifice 151 is either flowing or stopped depending upon control valve 141 being open or closed. When closed, the full oil supply pressure is applied inside bellows 71; when open, the low return oil pressure is felt by bellows 71, on account of the large pressure drop through restricting orifice 151. Only one bellows at a time needs feel the full oil pressure. This is accomplished by connecting line 157 of control valve 141 in FIG. 11 to one air valve bellows and line 159 to the other air valve bellows, with restricting orifices 151 on each line installed downstream of the connection. In FIG. 13, again, each line 157 and 159 is connected to one gas valve bellows, but restricting orifices 153 are located upstream of these connections and the oil flow through the control valve is inverse of what it is for the case of the air inlet valve bellows actuation. In FIGS. 12 and 13, the oil lines connecting the other bellows in a parallel loop are shown and identified as 161, 163, 165 and 167. It should be pointed out that: when the free piston reaches the end of each stroke (minimum volume inside the combustion chamber), both valves venting that combustion chamber are closed. Both valves venting either combustion chamber are never open at the same time, but can be closed at the same time. When any valve is open into a combustion chamber, air flows from valve chamber 89 into the combustion chamber and combusted gas flows from the combustion chamber into valve chamber 89. This means that, to open, the air valves do not have to counteract a pressure force acting to keep them closed, but, on the contrary, to open them. However, the gas valves must counteract a pressure higher in the combustion chamber than it is at that time in the valve chamber. This situation is somewhat alleviated by the fact that the minimum and maximum oil pressures inside the gas valve actuating bellows are always higher than those felt inside the air valve actuating bellows. This is illustrated by the graphs of FIG. 14 which show the forces acting on the valve stems due to bellows pressures and spring forces, during the opening phase as a function of time. The force $F_s$ corresponds to the force exerted by the spring at mid-opening position of the valves. The shaded areas correspond to the spring force variations with valve travel. Gas outlet valves have larger forces available to open than do air inlet valves. This results from the fact that if the various pressure levels available and the pressure drops across the restricting orifices and the pilot valves are as follows:

$P_{max}$→Max. oil pressure level available upstream of any first restriction in oil feed lines;

$P_{min}$→Oil return line pressure downstream of all restrictions;

$\Delta P$→Pressure drop across any restricting orifice; and $\delta P$→Pressure drop across the restriction presented by the pilot valve;

then, the maximum pressures ever felt inside the air and gas bellows are:

Air valve bellows max. pressure level = $P_{max} - \Delta P$

Gas valve bellows max. pressure level = $P_{max}$ (no oil flow) and, the minimum pressures ever felt inside the air and gas bellows are:

Air valve bellows min. pressure level = $P_{min}$ (no oil flow)

Gas valve bellows min. pressure level = $P_{min} + \delta P$

The proper selection of $\Delta P$, $\delta P$, spring force, valve size and maximum oil pressure level permits the use of identical parts for all valves, thus resulting in similar operating characteristics for both air and gas valves. Only the control valves, restricting orifices and bellows connections are arranged in a different manner.

The free piston shown inside the combustion member of FIG. 4 is subjected to no external forces, except for those resulting from the pressure felt inside both combustion chambers. The piston has no direct, physical or solid connection with any other component. This has the advantage of letting the piston select its angular position within the sleeve of the combustion member, which may not result in the best selection always in terms of wear patterns. The disadvantages are numerous, such as lack of: cooling means, lateral guidance to prevent the piston from falling into a bad wear pattern, positive and automatic means of connecting the piston and valve positions, fuel injection and spark plug activation signals. Therefore, it is desirable to eliminate these disadvantages as is done in the free-piston/combustion-member assemblies illustrated in FIGS. 15 through 30.

Referring to FIGS. 15 to 24, both piston 200 and combustion member 250 include structural appendages 202 and 204 for the piston, 252 and 254 for the combustion member, all mounted axially on the end faces of the piston and of the combustion chambers, as appropriate. The piston appendages penetrate into and are contained and guided by the combustion member appendages located externally. The guided travels of the piston appendages are exactly equal to the free piston stroke between the two combustion chambers. The diameters of these appendages are small compared to the piston diameter. The combustion chambers are then annular in shape and sealed off by seals 256 and 258. The free piston becomes guided longitudinally and positioned laterally by bearing lands 260 and 262 that are part of the combustion member external body, which means that the piston need not even come in contact with the combustion member sleeve, except by means of the seal rings 146. As shown for clarification in FIG. 10, an elliptical motion of an imaginary point on the piston outer cylindrical wall is used (thin continuous line between points 0 and 1). This type of motion is desirable to minimize and spread the piston-sleeve wear. It also allows the generation and detection of signals on both strokes of the piston (left-to-right & right-to-left), as to the exact piston position, at any time, without the risk of associating any piston position with the wrong piston motion direction. This elliptical motion is imparted to the piston by means of a plurality of stubs 264 and 266 mounted on the extremities of the piston appendages, guided by and riding in a plurality of grooves 268 and 270, cut on the internal surface of appendages 252 and 254 and elliptically contoured as depicted in FIG. 26 in which the developed internal surfaces of appendages 252 and 254 are shown. The length of the ellipse is the same as that of FIG. 10. For ease of illustration and simplification, both sections of FIGS. 15 and 16 are shown as being taken along grooves 268 and 270 centerlines as shown in FIGS. 25 and 26, for reasons soon to be explained.

With the piston motion being detectable physically and easily tractable, the monitoring of the air and gas valves of both combustion chambers can be done directly and automatically. The assembly of appendages 202 and 252 is used to monitor the air inlet valves and the assembly of appendages 204 and 254 is used to monitor the combusted gas outlet valves; the control valve of FIG. 11 can be then dispensed with. To that effect, high pressure oil is introduced through pipes 272 and 274 in FIG. 15, 269 and 289 in FIG. 21, all located at the end of both appendage assemblies. In FIG. 21, the oil inlets from oil pipes 269 and 289 into ducts 211 and 213 are through oil chambers 201 and 203, in which pipes 269 and 289 vent. Chambers 201 and 203 are not connected because the oil pressures in ducts 211 and 213 are not the same at all times. The low pressure oil lines 276 and 278 collect the oil back for return to the oil sump or oil cooler. In FIG. 15, the high pressure oil travels through twin channels 280 and 282 located inside ducts 284 on which valving sleeve 286 can rotate when actuated by rack 288 that drives pinion 290. Valving sleeve 286 itself is contained within piston appendage 202 and rotates within it. Holes 292 in the wall of duct 284 let oil flow in chambers 293 opened to holes 294. When holes 294 in valving sleeve 286 are open, the oil is allowed to flow out of chamber 293. When holes 294 are closed, the oil flow is stopped. The opening and closing of these holes 294 is done by the sliding of lands 296 located in the inside of appendage 202. Passages 298 allow oil to flow freely between recesses 291 and 295 on either sides of lands 296. Lands 296 have edges 297 and 299 that open or close holes 294, but in different fashion. Edges 297 are in a plane perpendicular to appendage 202 axis, whereas edges 299 are helically shaped so as to open or close holes 294 for different piston 200 positions, depending upon the angular position of valving sleeve 286 as positioned by pinion 290 and as monitored by sliding rack 288. The end result is illustrated in FIG. 20 where land 296 is shown developed flat against the background of the developed surface of valving sleeve 286 outer surface. The arrows f, $f_1$ and $f_2$ indicate the types of relative movements that valving sleeve 286, land 296 and hole 294 in valving sleeve 286 are permitted by valving sleeve command and piston 200 motion. Hole 294, in position a, would just start being uncovered with piston 200 moving left ($f_2$) or just finishing being covered with piston 200 moving right ($f_1$). If in position b (valving sleeve having been rotated in the direction of f), hole 294 would remain covered for a longer amount of motion of piston 200. Because the strokes of piston 200 back and forth must be the same and because, at any given time within a fraction of a second, the operations of the two combustion chambers must be identical, the other land 296', diametrically opposed to that shown in solid line, but located on the right side of hole 294 in the bottom half of the section view of FIG. 15, must operate in a symmetrical way as depicted in FIG. 20 where land 296' is shown in phantom lines. To keep appendage 202 well guided on valving sleeve 286, small lands such as 231 and 233 protrude inward from appendage 202 inner surface. As is now evident, the valving of control valve 141, through pilot valve 145 is replaced directly by piston 200 motion back and forth. This operates the air inlet valve bellows, but with one difference though: the hydraulic circuitry and arrangement of FIG. 13 must be used in conjunction with this arrangement, because the air inlet valves are open when land 296 or 296' closes holes 294. The influence of the angular position of valving sleeve 286, and thereby of holes 294, is shown in the diagrams of FIG. 9 where solid lines 1 and 1' correspond to hole 294 position b, and dotted lines 2 and 2' correspond to hole 294 position a of FIG. 20. The combustion chamber pressure needs not be monitored and pressure sensor 142 is not used.

The appendage assembly of FIG. 21 contains the oil valving arrangement needed to monitor the combusted gas outlet valves. The hydraulic circuitry and arrangement of FIG. 13 are again used, with control valve 141 being replaced by the system described below. The upper half of the section view of FIG. 21 pertains to the operation of the right side gas valve and the lower half of the section view of FIG. 21 pertains to the operation of the left side gas valve of FIG. 4. The section of FIG. 21 is taken along the centerlines of grooves 241 and 245. There are two such grooves elliptically shaped and diametrically opposed. These grooves contain one land each: 243 in groove 241 and 247 in groove 245, also elliptically shaped, but only slightly longer than half of the ellipse major axis length. These are shown superimposed on FIG. 21 for ease of comparison of location. Therefore, the ellipse segments that represent lands 243 and 247 overlap at both ends and are symmetrically disposed with respect to the ellipse center. The ellipse centerline major axis length is the same as either piston 200 stroke or the major axis length of the ellipse of FIG. 26. Lands 243 and 247 shut off holes 215 and 217 when sliding in front of them. Otherwise, these holes open into grooves 241 and 245. Channels 211 and 213 are connected to holes 215 and 217. When not covered, holes 215 and 217 permit oil to flow freely; when closed, the oil pressure builds up in channels 211 and 213. When holes 215 and 217 are open, the oil returns through ducts 209 and 219 to the oil return line 229, inside guide duct 205, and located between high pressure oil channels 211 and 213, then to the return lines 278. Holes 215 and 217, and grooves 241 and 245 being diametrically opposed with respect to the axis of appendage 204, as illustrated also in FIGS. 23 and 24, the motion of lands 243 and 247 with respect to holes 215 and 217 is best followed on a common graph, as shown in FIG. 25, in which the top and bottom groove-land arrangements of FIG. 21 are superimposed for ease of understanding. Land 243 inside groove 241 is shown in solid line and marked "top", whereas, land 247 inside groove 245 is shown in phantom line and marked "bottom" for ease of identification. For instance, if one hole (215) is at location c, the other hole (217) is at location c'. If hole 215 is at location d, hole 217 is at location d'. If the ends of land 247 are at locations a and b, then it is easily seen that, for instance, for a location such as d or d', both holes are covered by their own respective corresponding land. For any hole location other than where lands 243 and 247 overlap, only one hole can be covered at any time, but alternatively. Assuming that positions c of hole 215 moves in the direction of arrows $f_1$, $f_2$, $f_3$ and $f_4$, positions c' of hole 217 move in the reverse direction, but with c and c' being (or d and d') always opposite to each other with respect to the major axis of groove 241 (or groove 245) ellipse. A partial section of groove 241, hole 215 and land 243 is shown in FIG. 22'.

The position of guiding stubs 264 or 266 and the surge in oil pressure in the oil lines leading to the air inlet valve bellows, when holes 294 become covered, can be used to detect and signal the piston position in order to trigger, with or without a time delay, the ignition spark plug activation and the fuel injection, in the appropriate combustion chamber. In FIG. 21, the piston locations, one for each piston direction, are detected by two sensors 220 and 221, either ultrasonically or magnetically as described earlier for sensor 134, mounted in casings 222 and 223 affixed on appendage 254 wall, in line with groove 270, but with one sensing device in each longitudinal half of the elliptical groove, such as points a and b of FIG. 26. The passing of guiding stub 266 initiates the signal that indicates the piston location and which is sent by electrical lines 224 and 225 to master control 140.

The presence of cylindrical appendage 202 or 204 at the center of the combustion chamber requires relocation of the spark plug and of the fuel injector. The vortex motion of the air, and air-fuel mixture which results in the combustion chamber, can only be advantageous to facilitate the combustion process. The detail of the air inlet valve arrangements of FIGS. 27, 28 and 29 show valve 104 equipped with an air deflector 227. It is intended to impose to the vortex its direction. When valve 104 is in the open position, the air is admitted inside the combustion chamber so that the momentum given to the incoming air imparts this momentum to the gas inside the combustion chamber. The arrows f shown in FIG. 29 illustrate such vortex motion. In FIG. 30, a phantom line indicates where the piston is located when the fuel injection is initiated. A dip 207 is shown cut on piston 200 face to accommodate spark plug 116 stem, it is crescent shaped so that the piston rotation can be accommodated, without mechanical interference, as depicted in FIG. 29.

Access to the inside of piston 200 is possible through the hollow cores of appendages 202 and 204. The oil returning from the hydraulic valve monitor, back to the oil sump is channelled to flow always unidirectionally across the piston, as shown by arrows f of FIG. 31. This direction of the oil flow can be imposed by giving the oil return channel, within appendage 202, a cross-section much smaller than that of appendage 204 or even closing it completely. Low pressure oil enters piston 200 by channel 234, the oil flow is forced to flare out by deflector 236 and is then collected by duct 237, after having cooled the piston internal surface, then eventually exits through oil line 278 as shown in FIG. 21.

A configuration showing another arrangement of piston, piston guidance, piston cooling and lubrication, and piston location detection is presented in FIGS. 32, 33 and 34. Low pressure cooling fluid is introduced through pipe 173 and through a plurality of holes 175 into duct 234. The cooling fluid flow is directed around the piston internal surface 177 by deflectors 238 and 240. The cooling fluid leaves through duct 237 to end up in return line 278. In the process, some cooling fluid also lubricates the surfaces of stubs 264 and 266, out of guiding grooves 268 and 270. A second higher pressure oil line brings high temperature lubricating oil through line 271 to telescoping tube assembly 273 to channel the oil to a plurality of tubes 275 connected to a plurality of ducts 277 located inside the piston wall. From ducts 277, the oil then reaches circular groove 279 located on the outer piston surface and located between piston rings 146. A specially shaped lubricating ring 133 helps distribute the lubricating oil which is all used in the configuration shown in FIG. 32, and eventually burnt. Another configuration, not shown in FIG. 32, returns the oil at a lower pressure through another set of duct 275 and telescoping tube assembly 273, located outside and concentrically to tube assembly 273. The telescoping tubes of assembly 273 are not sealed and some lubricating oil leaks into the cooling fluid. These two fluids are compatible in nature. If this is not the case, greater care can be taken to prevent the lubricating oil from leaking into the cooling fluid. Telescoping tube assembly 273 is guided inside appendage 202 bore by means of radial tabs 281 mounted on the outer tube of the telescoping tube assembly. The inner surface of appendage 204 is lined with a plurality of flat rings such as 135 and embedded into the wall of appendage 204. These rings are made of a material detectable by the sensing component 171 that is mounted in sensing probe 137. Each time the sensing component passes by a ring 135, a signal is felt and sent through electrical cable 169 located inside sensing probe stem 172 to master control 140. Piston 200 location, at all time, is then monitored and its velocity and direction determined and handled as previously mentioned. Combustion member 250 outer wall can be cooled by water jacket 148. In this piston/combustion-member arrangement, the angular position of piston 200 does not have to be related to its longitudinal location. To improve the piston and combustion member sleeve wear situation and to provide a more gradual transition in the motion of guiding stubs 264 and 266, the guiding grooves 268 and 270 can be shaped to follow a lemniscate pattern as depicted in FIG. 34. As easily seen by comparing the elliptical track inner wall 267 of elliptical groove 268, the radius of curvature is smaller in the case of an ellipse, even though the total width w of a lemniscate is smaller than the minor axis length W of an ellipse of same major axis length. Also, the guiding stubs 264 can travel either along the arrows shown in solid line, inside the lemniscate track or in phantom line inside the lemniscate loops. The combustion member will work equally well either way; but by changing the piston angular motion direction, from time to time, wear patterns could be altered and improved.

The diagrams of FIGS. 35 and 36 illustrate how the components and controls of the two basic configurations of external combustion described above are interconnected and interrelate. FIG. 64 is a legend of symbols used in the schematic diagrams of FIGS. 35 and 36. A battery 251 supplies the electric power. The oil is pumped from oil sump 253 by oil pump 255 driven by accessory shaft 59. A fuel pump 259, fed from fuel tank 257, also driven by shaft 59 sends the fuel under pressure to fuel control valve 265 which receives the driver's input 283 needed to set the engine power level. Letters a, b, c, d and e are used to indicate how the interrupted lines of the diagrams are connected, for sake of illustration simplification. The legend identifies the various symbols used to represent the various components shown in the diagrams. Air, gas, oil, fuel, signal and electrical lines are also identified as to their nature. FIG. 35 represents the free piston without appendages. FIG. 36 represents the free piston equipped with appendages and piston cooling. In FIG. 36, the changes in pressure inside the air inlet valve bellows are detected by sensors 248 and 249 and the signals are sent to master control 140. An air cooled radiator 261 is shown with an air flow 263 impinging on it. The power level of the engine of FIG. 35 is determined by the combined action of the driver's command on master control 140 and fuel control valve 265. The power level of the engine of FIG. 36 is determined by the combined action of the driver's command on master control 140, fuel control valve 265 and air inlet valve control 288. The water injection system is not shown on these diagrams as it is not essential to the understanding of the engine basic arrangements.

Another combustion member configuration is presented in FIGS. 37 through 41, in which the use of poppet valves for air and gas valving in and out of the combustion chamber is eliminated. Air and gas valving is done automatically by means of openings in the piston, 175 and 177 for air, 174 and 176 for gas, that match and register with ports in the sleeve, 178 and 179 for air, 180 and 181 for combusted gas. Air ducts 183 and 185 connect the openings 175 and 177 to their respective combustion chambers. In FIG. 37, the lateral locations around piston 190 outer surface are not correct, although located correctly longitudinally, for simplification sake. The perspective view of piston 190 in FIG. 38 and the cross-section shown in FIG. 39 indicate how the openings in the piston and the ports in the sleeve are located with respect to each other, both laterally and longitudinally. As previously described, an oscillatory motion is imparted to piston 190 which results in an elliptical curve on the developed internal surface of sleeve 198 as would be traced by any point located on piston 190 outer cylindrical surface. The result of this relative motion between the piston inside the sleeve is a set programmed sequence of piston openings registering with their corresponding ports in the sleeve, as the piston moves back and forth, oscillating in the process, as indicated by the solid lines of the graphs of FIG. 9 where the word "valve" now refers to the valving operation instead of the poppet valve system.

Piston 190 is hollow and slides on a hollow stem 192 as illustrated in FIG. 37. Stem 192 is rigidly mounted on the combustion chamber dome walls. The inside of stem 192 provides for lubricating and cooling oil to be channelled inside piston 190 by a plurality of ducts such as 194 and 196 to lead the oil in and out of piston 190 internal cavity. Ducts 195 and 197 inside stems 192 are not connected directly and a wall 189 located between ducts 194 and 196 separate them. Arrows indicate the path that the cooling and lubricating oil is forced to follow. Midway between each of stems 192, a cylindrical flange 220 protrudes externally to stem 192 and is solidly attached to it. This flange contains ducts 194 and 196, and its outer cylindrical surface fits inside cylindrical surface 225 of cavity 222 inside piston 190. Two diametrically opposed guiding stubs 221 and 223 are mounted on flange 220. These stubs engage elliptically curved grooves 224 and 226 cut on surface 225 inside piston 190 wall. The length of the major axis of the centerline ellipse of these grooves, located on surface 225 and diametrically opposed, is equal to and determines piston 190 strokes. The length of the minor axis of that ellipse, as shown on a flat developed view of cylindrical surface 225, determines the degree of piston oscillating motion as indicated by angle α of FIGS. 38 and 39. The ellipse shown in phantom line inside cavity 222, within angle α of FIG. 39, shows graphically piston 190 motion. It corresponds to the projection of FIG. 37 ellipse, also shown in phantom line. The sections shown in FIGS. 37, 40 and 41 are along the centerline of one half of such ellipses and their corresponding grooves are shown as a straight cut groove in these figures for the sake of clarity. Lubrication of piston 190 is achieved by means of the lost oil process, whereby oil used for lubrication leaks out and burns in the combustion chamber. The end surfaces of stubs 221 and 223 are neither flat nor spherical, but cylindrical in shape, with the axis of such cylinder being perpendicular to the plane of FIG. 37, so as to produce a wedge effect (such as that obtained with journal bearings). This momentarily raises the oil pressure locally when stubs 221 and 223 pass in front of oil ducts 160 that are located at the bottom of guiding groove 226, midway between its two guiding walls. Also, the sliding outer surface of flange 220 is slightly chamfered on both sides to produce the same wedge effect against surface 225. A plurality of holes 162 are also provided to connect swiping and lubricating rings 133 housing groove 164 with cavity 222. Each time piston 190 passes through its mid-stroke position in either direction, the groove housings of rings 133 receives a small amount of lubricating oil. To insure that the back and forth motion of piston 190 is not unduly slowed down by the oil flow required from one side of flange 220 to the other, as piston 190 travels from one end of cavity 222 to the other end, a plurality of holes 166 drilled through flange 220 establish ample passage for the oil. In FIG. 38, cavity 222 and stem 192 are omitted for the sake of clarity. Air ducts 183 and 185 could be curved as indicated in phantom line so that the air exits into the combustion chamber at an angle, as shown by arrow f, to create the vortex mentioned for FIGS. 27 to 29. Air ducts 152 and 154, and gas ducts 156 and 158 connect the sleeve ports to the heat exchanger.

The piston/combustion-member assembly shown in FIG. 40, as a variation of the above described configuration, includes a set of telescoping appendages 121 and 122 attached to piston 191 and one combustion chamber. A telescoping tube assembly 123 located inside appendage 121 channels the cooling and lubricating oil out to outlet line 124. The oil is introduced into chamber 94 where it lubricates the guiding stub and groove asembly at the end of appendage 121 and flows between appendage 121 wall and the outer surface of telescoping tube assembly 123. An oil channelling arrangement 126 guides the oil along the internal surface of piston 191 for cooling purpose. A plurality of ducts 95 connect the piston internal surface to the groove of the lubricating ring. In this configuration, duct 95 can be fed lubricating oil at a pressure much higher by means of of another telescoping tube arrangement not shown, but located concentrically with and inside telescoping tube assembly 123. The guiding stub-groove assembly imparts to piston 191 the elliptical type of motion previously described. Piston 191 position and direction are again detected, as in FIG. 21, by sensors 220 and 221, for initiating fuel injection and spark plug ignition. A water cooling jacket 148 receives coolant through pipe 128 and it exits through pipe 129. The working of air and gas openings and ports is the same as described previously. The appendage assembly variation shown in FIG. 41 comprises a guiding stub-groove assembly modified in a way such that the stubs are located inside piston appendage 121 and the elliptically shaped grooves are located on the outside surface of cylindrical hollow structure 96 mounted on and concentric with combustion appendage 122. A ring 97 made of material most suitable for detection is solidly affixed to the end of piston appendage 121 on its external surface. The location of ring 97 is detected at all times by a plurality of sensors 134. Signals picked up by sensors 134 are collected by electrical connection 136 to be sent to master control 140 for processing.

FIGS. 42 and 43 show schematically two variations of an engine arrangement that comprises five units or segments such as that described previously as shown in FIG. 3. FIG. 65 is a legend of symbols used in the schematic diagrams of FIGS. 42 and 43. The schematics correspond to a top view of engine 1. The nature of vane compressors is such that high compression ratios cannot be obtained efficiently. In FIGS. 42 and 43, the arrangements depicted include two stages, both for the air compression and the gas expansion means, so that the compression and expansion ratios of each stage is kept low, but resulting in a much higher compounded value. Simply, if n is the number of such stages and p is the compression (or expansion) ratio per stage, the overall compression (or expansion) ratio if $P=[p]^n$. With $n=2$ (two stages) and $p=3$ to 4, the overall compression ratio can vary between 9 and 16, which covers the range of compression ratios commonly used for Otto or even Diesel cycles. In such a two-stage arrangement, it becomes very advantageous to cool the air being compressed, between stages. A mixture of water and methanol, or methanol by itself, can be injected in the air, after it leaves the first stage and before it enters the second stage of the compression process. In FIGS. 44 to 46, a liquid injection arrangement 31 includes a mixing chamber 32 attached to outer shell of injection means 31 by fairings 38, into which compressed air brought from the compressor first stage outlet by duct 33 flows through holes 34, as shown by arrow f of FIG. 45. Liquid brought by pipe 35 is injected by injector 36. The mixture of air-liquid leaves through duct 37 to enter the inlet of the second stage compressor. The tangential admission of air as shown in FIG. 44 insures a vortex movement of the mixture between mixing chamber wall 32 and the outer shell of the liquid injection means 31. The liquid should be given time to mix well with the air, but not to vaporize appreciably before it enters the second stage of the compression means.

For illustration purpose, five engine segments are shown in FIGS. 42 and 43. These segments are all identical except for their width M and N, M for the first stage and N for the second stage. With three large segments and two narrower segments, in this instance, the compression ratio is: $[3M/2N]^2$. For $M=2N$ as in the case illustrated, the compression ratio is 9. In FIG. 42, the second stage segments are sandwiched between the first stage segments. In FIG. 43, the second stage segments are located at both ends of the segment stack. There may be practical advantages for each arrangement. Also, the segments need not be in line, but each segment could be rotated around the engine axis 360/s degrees, if s is the number of segmenfts, for better cooling, wear pattern and vibration elimination reasons. In any event, the inlet and outlet ports for both air and combusted gas are interconnected as shown. The legend identifies the nature of each port. The water-methanol injection means 31 are indicated.

Another combustion chamber and piston arrangement is presented in FIGS. 48 to 59 where two combustion chambers 301 and 303 are located between the heads 305, 307, 309 and 311 of two oscillating pistons 302 and 304. These two pistons slide inside a circular and annular cavity 313 which may have a square, rectangular or circular cross-section. When cavity 313 cross-section is circular, cavity 313 volume is a torus and pistons 302 and 304 become two segments of the same torus. The two circles 306 and 308 shown in phantom lines in FIG. 49 represent the cross-sections that cavity 313 would then have. A square cross-section 310 is used for illustration purpose. The two combustion chambers 301 and 303 are formed when pistons 302 and 304 move in unison in the directions of arrows $f_1$, $f_1'$, $f_2$ and $f_2'$ respectively. Only one combustion chamber is formed at any given piston travel stop, alternatively. Compressed air is admitted in these combustion chambers through valves 312 and 314 (left side of FIG. 49). Combusted gases exit through valves 316 and 318 (right side of FIG. 49). Fuel is injected by means of fuel injector 315 and spark plug 317 provides the ignition. The relative positioning of pistons 302 and 304 with respect to the walls of cavity 313 and with respect to each other, near the end of their oscillatory strokes is achieved by means of gears 320 and 322 that mesh with gear teeth 324 and 326 cut on the inner wall of pistons 302 and 304 respectively.

These two gears drive gears 328 and 330 that are mounted on hollow shafts 332 and 334, respectively. Located inside those shafts are two torsion bars 319 and 321 to connect the outer ends of shafts 332 and 334 to a common intermediary flange 323 equipped with a pair of receptacles 325 and 327 in which the inner ends of torsion bars 319 and 321 are located. The outer ends of torsion bars 319 and 321 are splined and fit inside female splines cut inside hollow shaft 332 and 334 outer ends. The inner ends 329 and 331 of torsion bars 319 and 321 are semi-free to rotate and become restrained only when fins such as 333 and 335, attached to inner end 329, make contact with stops 337 and 339 located inside receptable 325, for instance, as shown in FIGS. 50 and 51. Unless contact is made between fins 333 and 335, and stops 337 and 339, torsion bars 319 and 321 exert no torque on hollow shafts 332 and 334. However, when contact is made, a restoring torque then develops, as the piston overshoots the stop for its normal stroke, because flange 323 is solidly secured to cavity 313 inner wall 341 by a structure such as 340 of FIG. 49. This restoring torque is transmited back to piston 302, for instance, by means of shaft 332, gear 320 and gear teeth 324. Under normal steady operating conditions, the stopping of pistons 302 and 304 is accomplished by the compression of gas in combustion chambers 301 and 303. Under such conditions, the total angular trowel of fins 333 and 335 is $A = 180° - a' - a - s_1 - s_2$, where a, a', $s_1$ and $s_2$ represent the angles identified in FIG. 51. $s_1$ and $s_2$ also represent the angular spaces left between fins 335 and stop 339 at the end of piston 302 and 304 travels. Angle A defined above corresponds to angle A shown in FIG. 48 between lines 388 and 389. An additional stop is provided inside both pistons by means of bumpers such as 343 and 345 that are located inside piston 302 and that make contact with internal bosses 342 and 344 located inside piston 302 near the piston heads which are equipped with piston rings such as 346 and 348. Bumpers 343 and 345 are kept extended by oil pressure applied behind them by means of oil duct 349. Restricting orifice 350 insures that, when contact between bumpers and piston takes place, a quasi solid stop is then provided for piston 302. Bumpers 343 and 345 are located in and guided by hollow cylinder assembly 351 which is mounted on flanges 353 and 355 that constitute the side walls of cavity 313, by means of shanks 352 and 354. Openings such as 357 located on the sides of piston 302 provide the clearance needed to permit the piston oscillatory motion to take place unhindered. A smaller opening 359 is provided in flanges 353 and 355 for installing the bumper assembly inside piston 302 when piston 302 is already installed inside cavity 313. Bumpers 343 and 345 are retained by flanges 356 and 358 respectively inside cylinder 351.

In this combustion chamber configuration, the valves are directly actuated by cams directly connected to the piston motion. Rotating flanges 356 and 358 are mounted on hollow shafts 332 and 334 respectively. The external faces of these two flanges have protrusions with flat surfaces parallel to the flange surfaces. The elevation of these protrusions varies between two set values: low and high. Inclined ramps connect the low and high elevations, thereby providing the camlike action needed, as flanges 356 and 358 rotate with hollow shaft 332 and 334 oscillatory motions. There are two sets of four cams, one set for each combustion chamber. The rotary motion of these cams is directly related to that of pistons 302 and 304 and thereby to the combustion chamber creation between two adjacent piston heads, every half cycle. In FIG. 48, the flat elevated surfaces of these cams are shown by concentric circular segments and are shown for both flanges for ease of illustration. Actually, half of these cams are located on each flange, with each flange being equipped with one set: admission cam, exhaust cam, fuel injection cam and ignition cam. In FIG. 49, again, sets of fuel injection and ignition cams are shown on both sides of the combustion-chamber/piston assembly to show the relative radial location of these cams. For ease of illustration also, in FIG. 48, the admission and exhaust cams are shown at a different radial location so that they do not interfere on the drawing and can be more easily represented. However, these cams are actually located at the same distance from center O, but the air admission cams are on one side of FIG. 49 sectional view and the gas exhaust cams are located on the other side. Cams 360 and 362 are used for the actuation of the inlet valves and cams 361 and 363 are used for the actuation of the exhaust valves. Cams 364 and 366 actuate microswitches 368 and 370 for the control of fuel injection. Cams 365 and 367 actuate microswitches 369 and 371 which control spark plug activation.

Air inlet valves and combusted gas outlet valves are actuated by rocking levers such as 372 and 374. Tension springs 373 and 375 maintain rollers 377 and 379 that are located at the tip of rocking levers 372 and 374 in constant contact with their respective cams. As depicted in FIG. 53, these rollers can move laterally on a shaft 380 located at the end of rocking lever 374 by means of a journalled ball bearing 381. Shaft 380 is helically grooved so that balls such as 382 can roll along and be guided by grooves such as 383. Rollers 377 and 379 outer surfaces have small longitudinal indentations 384 that match similar indentations 385 that are present on the contact surfaces of cams 360, 361, 362 and 363 as shown in FIGS. 53 and 54. FIG. 53 shows a section of a double track cam which corresponds to the part of the outlet valve cam which keeps the outlet valve open, regardless of the piston motion direction, as illustrated in FIGS. 10 and 48. Two cowlings such as 390, located on each side of the combustion chamber/piston assembly, cover and protect all external moving pars such as rocking levers, rollers and microswitches. These cowlings also support the microswitch assemblies that control the fuel injection and spark plug energizing means. Each cowling is equipped with windows covered by flexible and easily removable caps such as 386 for inspection or adjustment of parts. The only internal and direct mechanical connection between each side of the combustion member assembly is by means of centering pin 387 which is pressed inside flange 323 and fits loosey inside holes centered in ends 329 and 331 of torsion bars 319 and 321.

Torsion bars 319 and 321, bumpers 343 and 345 limit and control piston 302 and 304 strokes so that the volumes, locations and shapes of combustion chambers 301 and 303 remain almost the same all the time. Phantom lines 388 and 389, 391 and 392, in FIG. 48 represent the external limits reached by the front faces of pistons 302 and 304 at the end of their strokes. The volumes defined by these lines and the walls of cavity 313 determine the smallest volumes of both combustion chambers. The risk of interference between the pistons and the inlet and outlet valves, at any time, is eliminated by preventing these valves from travelling beyond the inner wall of cavity 313 as shown in FIGS. 49 and 55. To facilitate the admission of the compressed air in and the exhaust of the combusted gas out of the combustion chambers, the walls of cavities such as 393 are ellipsoidally shaped. Referring to FIG. 55, which represents a cross-section of an outlet valve taken along the small axis of such ellipsoid, phantom lines 394 show valve 316 at its maximum opening position, phantom lines 395 show the outline that cavity 393 wall would assume if the section were made in a plane orthogonal to that of FIG. 55. Phantom line ellipse 396 indicates the connection with manifold 397 in such an instance. Phantom lines of arrows f show how most of the air and combusted gases enter and leave cavity 313 as the case may be. Solid line 398 illustrates how narrow the gas and air pasages between the valves and structure 355 would be if it were not for the ellipsoidal shape of cavity 393.

Referring back to FIGS. 48 and 49, power takeoff means are shown and include a gear 400 for driving shaft 401. Gear 400 meshes with gearing teeth 402 cut on the outer surface of piston 302 so that piston 302, in its oscillatory motion, can impart an alternating rotary motion to shaft 401. Both pistons, 302 and 304 are similarly equipped with power takeoff means. As piston 302 front face, for example, oscillates between phantom lines 388 and 388', 391 and 391' which represent the other ends of piston 302 strokes, gear 400 completes over two revolutions, given the gearing ratio shown in FIG. 48. FIG. 56 illustrates how the angular velocity $\omega$ of shaft 401 varies with time as piston 302 oscillates back and forth under steady operating conditions. The half period $\tau$ corresponds to the two revolutions of shaft 401, just mentioned. The angular velocity $\omega$ varies with piston 302 linear velocity, for instance, between a and —a at high speeds and possbily b and —b at lower speeds of the piston.

For most power needs, a continuous direction of rotation is usually required. FIG. 57 depicts an automatic rotation direction inverter which is connected to shaft 401. It consists of a plurality of gear trains 405, 406 and 407 that are connected to a common shaft 408 held inside a fixed housing 409. Two gears can free wheel on shaft 401, gear 410 is designed for internal drive and gear 411 is designed for external drive, but they both mesh with gears of train 405 and 406. Both gears 410 and 411 are equipped on their internal faces with ratchet-like teeth that can engage similar teeth installed on the ends of sliding sleeve 412 which includes a ball and cage assembly 413 mounted on shaft 401. The balls of assembly 413 are restrained and guided by helical grooves such as 414 cut on the surface of shaft 401. FIG. 58 is a partial view, seen from shaft 401, of a ball 415 of assembly 413 and of ratchet teeth on the faces of gears 410 and 411 and of the matching teeth located at both ends of slidable sleeve 412. When sleeve 412 is in its extreme left position, teeth 417 and 419 mesh, when sleeve 412 is in its extreme right position, teeth 416 and 418 are engaged. In FIG. 57, sleeve 412 is shown in a neutral (not engaged) position and any rotation motion of shaft 401 is not transmitted to output shaft 420 which is solidly affixed to gear 421 by locking key 422. Central pin 423, free to rotate in one shaft or in both, is used to keep both shafts centered and in line.

Referring back to FIGS. 9 and 10, where it is shown that fuel injection and ignition must be initiated after compressed air has been admitted in the combustion chamber, it can easily be seen that, during the return stroke of the piston, when the combusted gases are pushed out of cavity 313, fuel injection and ignition signals must be ignored. The means illustrated in FIG. 59 indicate how this is achieved. In series with microswitches 368 and 369, microswitch 425 actuated by rocking lever 372 closes or opens depending upon the position of the inlet valve. Also, FIGS. 9 and 10 indicate that inlet valves and outlet valves that vent into the same combustion chamber must never be opened at the same time. However, FIG. 48 shows that the admission and exhaust cams overlap angularly. Such simultaneous opening, though, is prevented by the use of slidable journals such as 381 of FIG. 53 and located on shaft 380. The direction of piston 302 or 304 motions determines which tracks of the admission and exhaust cams are to be ridden by rollers 377 and 379, at any time.

FIGS. 60 and 62 show how the circular combustion chamber of FIGS. 48 and 49 is connected to both engine 1 and heat exchanger 30 of FIG. 1 so that an overall power plant configuration such as that illustrated in FIG. 1 can be packaged in a more compact manner. For ease of illustrative understanding and in a schematic way, both sides of the circular combustion chamber are represented in FIG. 60 in which the upper and lower halves of the valves each represents a full valve, inlet or outlet as the case may be, with respect to section line 61—61. In FIG. 61, the connections between the ducts and the combustion chamber valves also represent both sides and are shown in phantom line. Phantom line 430 separates the ellipse 431 into two halves with each half representing schematically one inlet valve. Phantom line 432 separates the ellipse into two halves, again with each half representing schematically one outlet valve, for ease of illustration. Heat exchanger 30 is shown sandwiched between one of the circular combustion chamber assembly cowling 390 and one face of engine 1. The ducting means between these three components is shown schematically in phantom lines for the complete power plant assembly. The ducting means include ducts 435 and 436 that connect engine 1 compressor outlet 17 to heat exchanger compressed air inlets 437 and 438, ducts 439 and 440 that connect heat exchanger compressed air outlets 441 and 442 to axially oriented ducts 443 and 444 which connect to air manifolds 445 and 446, ducts 447 and 448 that connect combusted gas manifolds 449 and 450 to heat exchanger combusted gas inlets 451 and 452, duct 453 that connects heat exchanger outlet 454 to the engine compressor gas inlet (or expansion chamber inlet) 19. Air is admitted in engine 1 and combusted gases are exhausted from engine 1 through ducts 7 and 25 respectively, as shown in FIG. 3. Air manifolds 445 and 446 direct the compressed air to inlet valves 312 and 314 respectively. Combusted gas manifolds 449 and 450 channel combusted compressed gas from outlet valves 316 and 318 respectively. Ducts 447 and 448 are located inside the body of the heat exchanger. Heat exchanger 30 consists of a flat structural flange 460, a smaller spherically shaped structural flange 461 to which engine 1 housing is attached, and an outer conically shaped shell 462 which structurally connects flanges 460 and 461. Inside heat exchanger 30, the channelling of the compressed air to be heated and of the combusted gases to be cooled forces the air and the gas to travel side by side, but separated by walls such as 463, 464, 465 and 466, all concentrically located between spherically shaped intermediary shells 467 and 468, so that the hot combustion gases are surrounded by cooler compressed air. Parallel and adjacent channels such as 469, 470, 471, 472 and 473 are thus created throughout the whole volume of heat exchanger 30. A multiplicity of arrows, shown in FIGS. 60, 61, and 62, indicates how the air and the gas circulate inside and outside of the heat exchanger. If water injection is also used in this power plant configuration, water is injected by water injectors 45 that are mounted on flange 460 and located near the inlet orifice of the compressed air inside the heat exchanger. Power takeoff shaft 29 is located on the engine face which is not in contact with the heat exchanger (right side of FIG. 61). Accessory drive shafts 401 can be located on either face of the combustion member, as the specific configuration and application of the power plant requires. Accessory drive shaft 59 is not available in this last configuration, because the left hand face of the engine is not accessible (in contact with the heat exchanger).

OPERATION AND DISCUSSION

To start the engine, a starter connected to accessory drive shaft 59 is energized and the rotor-vane assembly rotates, compressing air which accumulates in heat exchanger 30. By command from master control 140, all valves are maintained closed. After a short time, one air inlet valve is opened on one side and the gas outlet valve on the other side of combustion member 100 is opened. Piston 130 then moves in a known direction and its movement is detected and monitored by master control 140. At the appropriate time, before the piston full stroke is completed, with the piston moving in the correct direction, master control 140 automatically switches to normal operation. Fuel is injected as required, all valves start opening and closing sequentially as programmed. The spark plug operation is activated and on the subsequent return stroke of the piston, the starting procedure is completed. In the engine configurations where the direction of the piston is unimportant, the chance of the piston starting to move in any direction is even (cases of FIGS. 32, 33 and 34 for instance). For the other engine configurations, the piston can be first automatically positioned at the initiation of the starting cycle by means of the air inlet valve being properly monitored by a master control 140 command. Starter assistance may still be kept on for a few subsequent cycles. Such a starting operation bears more resemblance to the starting operation of a gas turbine than to that of an internal combustion engine. By limiting the amount of fuel injected and the opening duration of the air inlet valves, idling speed is set. To obtain a higher power level, more fuel is injected per piston stroke and more air is admitted in the combustion chambers by letting the air inlet valve remain open for a longer portion of piston 130 stroke, as indicated on the graphs of FIG. 9. It is possible to operate the present invention engine in such a way that air/fuel mixture ratios vary considerably less than is the case for gas turbines and internal combustion engines, during acceleration. The fact that energy in the form of compressed air is accumulated and stored in the heat exchanger, and is instantly available, makes the response to a demand for more power smooth and very swift. Engine deceleration, on the contrary, may be less quick for the same reason, unless means are provided by the master control to override the normal operation of the gas outlet valves, when control valves are used for the monitoring process. In the cases of the engine configurations of FIGS. 15 and 21, relief valves monitored by master control 140 can be used to by-pass the oil lines which lead to the gas outlet valve bellows in order to reduce the duration of their opening for each piston stroke. Also, the volume allocated to combusted gases in heat exchanger 30 can be made smaller than the volume occupied by compressed air. To stop the engine, fuel injection is shut off and spark plug activation is turned off.

Compared to conventional internal combustion engines in which the vehicle is directly and mechanically connected to the piston motion, whenever the clutch and gearbox are engaged, in the present invention, the vehicle can never be directly and mechanically connected to the power generating means (combustion-member/piston assembly). The only connection is by means of a compressible fluid medium which offers flexibility of use and provides elasticity and energy storage capability. The inertia of the moving parts of the engine, per unit of power, is comparatively very small, certainly smaller than that of internal combustion engines. Because the engine and the combustion member are not connected mechanically, the size of one component and its speed, or regime of operation, selected for maximum efficiency neither determines nor dictates the size or the regime of operation of the other. For instance, the engine could be running at 6000 rpm and the piston of the combustion member could be operating at 20 cps. To optimize combustion efficiency and permit the use of inexpensive but non-polluting fuels that could reduce atmospheric pollution levels, relatively oversized combustion chambers and a slower moving piston can be combined with a fast rotating engine, as in the example given above. The temporal requirements for efficient air compression and expansion are the reverse of those needed for efficient combustion. In gas turbines and internal combustion engines, a compromise must be arrived at and is such that neither process is optimized. The power plant of the present invention needs no such compromise, and each component can be optimized separately, then coupled together. The end result is a power source that is light, more efficient and less expensive to operate. Even if one assumes that, at the design point, the overall efficiency of the external combustion engine is no higher than that of an internal combustion engine, as illustrated by the graphs of FIG. 47, for any off-design point operation, its overall efficiency would be higher for all off-design operating points. This is due to the fact that, at any and all regimes and operating conditions, each component can be programmed to operate at its peak efficiency. The possibility to decouple the mechanical operation of the two basic components is the key. This is especially true for low power levels. The decoupling mentioned above and the ensuing mechanical flexibility provides the advantages that additional gears in the gearbox, in an automobile, would offer. The mechanical decoupling of the two basic power plant components also means physical decoupling. This results in additional advantages.

The two major components need not be built with the same materials. The materials best suited to meet the requirements for each part can be selected. For instance, new and better high temperature resistant materials are becoming available and their use is now being considered in the fabrication of some parts of internal combustion engines, such as: ceramics, filament reinforced carbon or graphite. The strength of carbon and graphite increases with temperature up to temperatures high enough to be quite meaningful in the present application. Such materials also have very low coefficients of thermal expansion. To illustrate the point being made here, one needs only remember that, without such possibility of mechanical and functional decoupling, gas turbines and jet engines would never have become practically feasible. For such engines to become efficient, specific, different and special materials had to be developed and are now used in the construction of each basic component of a gas turbine: compressor blades, turbine blades and combustion chamber walls. In addition, the present invention provides another type of decoupling: functional decoupling. It should be emphasized that the degree of such decoupling is not fixed, but can be optimized for each operating regime demanded.

To take full advantage of the design flexibility offered by all the combustion member possibilities, one can vary any or all of the following design parameters: piston stroke-to-diameter ratio, piston peak velocity, peak pressure inside the combustion chamber, piston weight and material. The operating parameters directly affected and to be optimized are: combustion efficiency, surface wear, noise and vibration levels, cold weather starts, cooling. This can be done without having to consider the usual constraints imposed on the design of internal combustion engines and which result from construction considerations and/or operational limitations and requirements. To facilitate the ignition of the air-fuel mixture, and sustain it, in the case low grade fuels are used, the spark plug can be of a high energy type. More powerful and longer lasting sparks can thus be generated. The initiation of the fuel combustion process depends no longer upon the start of an explosion or fuel self ignition. The cold start problems of gasoline and Diesel engines are eliminated. In addition, because the the engine air admission is not throttled, the expansion means can have a volumetric expansion ratio larger than the compression ratio, thereby extracting more energy from the combusted gas in the expansion chamber. This results in a higher thermodynamic efficiency of the cycle. This is achieved by making expansion chamber 5 larger than compression chamber 3 of engine 1 in FIG. 3. The higher the compression ratio, the higher the ratio of volumes 5 to 3 can be. This permits the thermodynamic cycle on a Pressure-Volume diagram to look more like a Brayton cycle (or gas turbine) than a Diesel cycle, but with a compression ratio between that of an Otto cycle and a Diesel cycle. On a hot and dry day especially, water or, even better, water-methanol injection in the air admitted to the compressor inlet (or between the first stage compressor outlet and the second stage compressor inlet) can further increase the thermodynamic efficiency appreciably. Water-methanol mixtures are corrosive for many metal alloys. Again, the use of ceramics or carbon-graphite composites, made more feasible in the present invention, can alleviate such corrosion problems and render the use of water-methanol injection very attractive. The use of such fluid injection can help the engine cooling problem on a hot day, especially for high altitude operation. The use of a heat exchanger between the compressed air and the combusted gas further increases the thermodynamic efficiency. For all the reasons enumerated and discussed above, the appreciably enhanced thermodynamic efficiency results in a considerable fuel saving, if comparison is made with a gasoline engine of equal compression ratio. As mentioned earlier, cruder and lower grade fuels, and less expensive than gasoline, can be used, possibly of non-fossil origin. The compounding effect of these various factors should result in substantial savings in overall operation costs. Lower noise and vibration levels mean more comfort and possibly some weight saving for the vehicle, meaning lower vehicle manufacturing costs. A better and more complete combustion of less volatile fuels can lead to an appreciable reduction in pollutant levels. A lower level of combustion temperatures, more like those typical of Diesel engines, means a lower or inexistant nitrogen oxide production. Because of the longer time available for the combustion process, for each cycle, the level of solid particulates emitted should be less than for Diesel engines, especially during acceleration phases, for reasons previously mentioned. The need for and the cost of anti-pollution equipment and accessory, and of the maintenance thereof, can be considerably reduced. Such additional savings cannot be ignored. The resulting elimination of leaded fuel must also be mentioned.

Once started and from the idle speed on up, the operation of all components and parts remain the same. To describe a typical complete cycle within combustion member 100, the simplest, yet complete assembly depicted in FIGS. 2 and 4 is used as a model. Using the position of piston 130 shown in FIG. 4 as a cycle starting point, with piston 130 moving in the direction of arrow f, fuel has just been injected and ignited in chamber 102 by spark plug 116. The air admission was also just completed and valves 106 and 120 are both closed. The fuel combustion proceeds as more fuel is being injected by injector 112. The pressure and temperature both rise inside combustion chamber 102, accelerating the piston motion toward the left and thereby displacing the combusted gas in chamber 101. Gas outlet valve 118 is open and the combusted gas there is pushed through exhaust duct 111 into heat exchanger 30 at a pressure level somewhere between the pressure then existing in chamber 102 and the air inlet pressure of the air in duct 113 waiting for air inlet valve 104 to open. When piston 130 approaches position 103 shown in phantom line, valve 118 starts closing. When piston 130 reaches position 103, both valves controlling combustion chamber 101 are then closed. A smaller volume of combusted gas is trapped and acts as a buffer to stop piston 130, and acting as a spring, kicks piston 130 back in the reverse direction. When piston 130 passes back through position 103, gas valve 118 remains closed, but air inlet valve 104 opens and admits compressed air in chamber 101. When enough air has been admitted, depending upon the power level required at this moment from the engine, fuel injection starts by means of injector 110. Valve 104 then closes as required for the power level desired and spark plug 114 is energized. Fuel combustion is then initiated in combustion chamber 101. The process described earlier for combustion chamber 102 is repeated exactly, as a mirror image, if the power level setting has remained the sme. Prior to piston 130 having reached position 103 toward the end of its leftward stroke, gas outlet valve 120 had started opening, a short while before gas outlet valve 118 had started closing. Therefore, the flow of high pressure combusted gas into heat exchanger 30 was never interrupted. Also, this action helped relieve the pressure on the right face of piston 130, thereby facilitating its spring back action. The synchronization and timing of the opening and closing of these two gas valves is very important.

Piston 130, is now well on its way toward the right, the fuel combustion in combustion chamber 101 is nearly completed, the combusted gas in combustion chamber 102 is being displaced into heat exchanger 30 through duct 115, the pressure in chamber 101 is at its peak. Valves 104,118 and 106 are closed. Valve 120 is open. Piston 130 rapidly approaches position 105 mentioned earlier. At that time, gas outlet valve 118 starts opening, the combusted gas in combustion chamber 101 begins to exhaust again into duct 111. Soon after, gas outlet valve 120 starts closing, until it is fully closed when piston 130 reaches position 105. Valve 106 is of course still closed. The gas trapped in the small volume on the right of piston 130 then again acts as a buffer and a spring to stop and then launch piston 130 back on its leftward stroke, its rightward stroke being then completed. Valves 104, 120 and 106 are closed. When piston 130 passes through position 105, now again moving in the direction of arrow f, air inlet valve 106 opens, compressed air is admitted in combustion chamber 102 and the process described earlier for combustion chamber 101 is repeated. Piston 130 reaches the position assumed earlier as being the start of the typical cycle shown in FIG. 4. A full piston motion cycle has just taken place. During this cycle, other events also took place, outside of the combustion member, but which are vital to the proper operation of the piston/combustion-member assembly, as just described. Those events, in chronological order, are described below as the piston follows the cycle discussed above:

1. Piston 130 location is continuously detected by sensors 134 and pressure sensors 142. The signals are sent to master control 140 where piston position, direction and velocity are calculated and also anticipated some time in advance, based on the past and present information processed;

2. The information generatd above is fed into a real time computer-simulator, preprogrammed to compare the timing of these signals to the timing required for the combustion member to operate properly, which includes the valve openings and closings, the initiation of fuel injection and spark plug activation, stopping the fuel injection and the spark plug activation;

3. The power level requirements are fed into the computer and used to adjust the timings of the air inlet valve closings, fuel injection and spark plug deactivation;

4. The preprogrammed information and the information inputed are combined to determine the exact set of all timings to be used for the piston next half cycle (one-way stroke); and 5. The appropriate signals are sent at the proper time to the following parts and components, and in the sequenced order listed below;
 (a) air inlet valve 106 control valve 141, to relieve the oil pressure so that valve 106 can close;
 (b) the fuel control valve 265, to start fuel injection through fuel injector 112;
 (c) the spark plug high voltage energizing system 216, to activate spark plug 116;
 (d) the fuel control valve 265, to stop fuel injection and system 216 to deactivate spark plug 116;
 (e) gas outlet valve 120 control valve 141', to apply high oil pressure to open valve 120;
 (f) gas outlet valve 118 control valve 141', to relieve the high oil pressure to close valve 118;
 (g) if pressure sensor 142 is used, and if malfunction occurs and the proper signal is not received by control valve 141', pressure sensor 142 signal is used to bypass and override the normal system, so that control valve 141' still receives the proper signal (if valve 118 did not close, piston 130 would then make solid contact with the internal wall of combustion chamber 101 or with any slightly protruding part affixed thereon, which would be disastrous);
 (h) air inlet valve 104 control valve 141, to apply high oil pressure to open valve 104;
 (i) step (b) is repeated, but for fuel injector 110;
 (j) step (c) is repeated, but for spark plug 114; and
 (k) step (d) is repeated, but for spark plug 114.

The above sequence corresponds to the system operation diagram shown in FIG. 35. In this configuration, piston 130 has no mechanical connection with the outside of the combustion member, it is absolutely free. In the configuration represented by the diagram of FIG. 36, the piston has lost some of its freedom, although no external force imposed by mechanical means is applied to influence its axial motion, except at the end of its strokes, where the rotation movement imparted to the piston extracts some of its longitudinal momentum to transform it into angular momentum. But for this interaction between these two types of piston motions, it is assumed that, for all other configurations, the piston is still free and responds only, in the axial direction, to the forces exerted through the application of the air and gas pressures on its two faces. Only those deviations from the basic operation described above, as they pertain to each modified version of the basic configuration, are discussed hereinafter.

The first modified configuration is that shown in FIGS. 15 and 21, in which both piston and combustion member are equipped with telescoping appendages. The role of these appendage assemblies is fourfold:

1. To impart an oscillatory lateral motion to piston 130, coordinated and synchronized with its axial motion;

2. To monitor and control the closing and opening of the combustion chamber valve;

3. To detect the location and direction of the piston; and

4. To provide cooling and lubrication to the piston.

Control valves 141 and 141' are replaced by sets of sliding tubes, acting as hydraulic on-off valves inside the appendage assemblies mentioned above, and directly related to the piston position. One major difference is the use of an intermediary valving sleeve 286, in FIG. 15, to permit a direct action on the timing of the closing of the air inlet valves. The piston location needs not be continuously detected by external sensors and only two sensors, 220, and 221 are left, each to detect a specific piston position. The piston cooling is done by the oil returning after it has been used as hydraulic servo-fluid. However, the action of piston 130, by the very essence of its alternating axial motion provides assistance in forcing the oil back to the oil sump. This is achieved by means of deflector 236 which offers a higher resistance to the oil flow, whenever piston 130 moves in the direction of arrows f of FIG. 31. Also, in this configuration, all valve bellows are pressurized to identical levels, either low or high, because they all are identically connected to the restricting orifices and the oil valving system, as shown in FIG. 36. The size of the restricting orifices for the air inlet valves oil system can be made different from that which is used for the gas outlet valves oil system, so as to adjust the oil low pressure levels in the bellows to values closer to what might prove more desirable.

The configuration of FIG. 32 corresponds to a hybrid between the basic free piston and the second configuration. The piston position sensors inside one of the two appendage assemblies are well protected and cooled by oil. The piston/combustion-member sleeve interface is lubricated by a lost oil process which takes place from inside the piston. The air and gas valves are monitored by control valves. The major difference is that the piston can follow either side of the guiding tracks used to give it its lateral oscillation. The piston lubrication system can use the cooling oil or a different type of oil more suitable for burning without leaving carbon deposits that have no way to disappear from inside the combustion chambers and which could build up to become detrimental to the good operation of the combustion member.

The last configuration, as shown in FIGS. 37 to 41, differs from the basic configuration by having the air and gas valves dispensed with altogether and replaced by sets of openings in the piston and matching ports in the sleeve. These come into register and go out of register automatically in a programmed fixed fashion which depends upon the piston axial location and lateral position in its oscillatory motion. The piston lateral oscillatory motion is imparted by the means described earlier, as shown in FIG. 40, or of the same type. But these means are located inside the piston itself, as described hereonunder. The phantom line ellipse of FIG. 37 depicts the resulting motion of piston 190. FIG. 38 shows all the valving openings on the piston cylindrical surface and the two matching ports in the sleeve. Openings 175 and 177, and ports 179 and 178 (not shown in FIG. 38) are used for compressed air inlet valving. Openings 174 and 176, and ports 180 and 181 (not shown in FIG. 38) provide the valving for the outlet of the combusted gas. However, the openings 175 and 177 must be connected by ducts 183 and 185 located inside the piston. These connect the combustion chamber which is the furthest removed from opening 175 or 177 as the case may be. This is dictated by the requirement that inlet and outlet valves that control the same combustion chamber can never be open at the same time obviously, and that two inlet valves should never be open at the same time either; whereas, outlet valves can and should be open at the same time, part of any cycle, as shown in FIG. 9, where the valving by the piston is illustrated in phantom lines for comparison with the valve operation of the basic configuration. Because the registerings of the piston openings and of the sleeve ports never correspond, on the basis of total time-integrated area, to the equivalent of a full poppet valve opening, which stays open for some time, the areas open to air or gas passage which vary continuously as the piston moves must have a larger maximum value. For the sake of simplicity, however, the full openings of both the poppet valves and the registered piston-openings/sleeveports are shown as being equal. They have been both normalized to correspond to their maximum area. What is shown in FIG. 9 is the percentage of opening area. One can say that the total amounts of open areas, integrated as a function of time, for each piston cycle should be about the same for either configuration. This means that the maximum open area of an opening/port at its optimum registering position must be much larger than the area of the passage created by a fully open poppet valve. The piston rings do not pass over the gas outlet ports in the sleeve, however, they must pass over the air inlet ports in the sleeve. The corners at the intersection of the internal surface of sleeve 198 with the internal wall of ports 178 and 179 must be properly chamfered. Although two air inlet ports in the sleeve are shown in FIG. 37, for ease of understanding, only one is needed as shown in FIGS. 38 and 39.

The piston oscillating motion is imparted by two guiding stub-groove assemblies as earlier discussed, but these assemblies are located inside piston 190 and the stubs are fixed, but the grooves move with piston 190. The piston motion is not detected directly and pressure sensor 142 again can be used to sense where the piston is at either end of its stroke. Taking into account the duration of the past stroke to predict the piston velocity during the following stroke, the location of the piston during the present stroke can be pre-established as a function of time. Fuel injection and spark plug activation can then be timed accordingly by master control 140. FIG. 40 shows a variation of the arrangement of FIG. 37, whereby the guiding stub-groove assembly is located inside a telescoping appendage assembly similar to that described for the second configuration. Piston location detectors can then be used again. In the appendage arrangement of FIG. 41, the stub-groove assembly is reversed, the grooves are located on an external cylindrical surface. This permits the use of a detecting system for locating the piston that is more refined and accurate than those described for the previous configurations.

When compared to all previous configurations discussed, the power plant arrangement depicted in FIGS. 48 to 62, exhibits a few basic operation differences which should be first mentioned: the combustion chambers are determined by the two piston heads, with no end fixed walls; the connections between the piston motions and the valves, fuel injection control and ignition initiation are all direct; power can be extracted directly from the piston motion; the two piston motions need not be synchronized automatically every half cycle; and the arrangement of combustion chamber/piston/heat exchanger is more amendable to compact packaging. The diagrams and curves shown in FIGS. 9 and 10, however, apply just as well to this configuration. Assuming that pistons 302 and 304 are moving toward the left in the direction of arrows $f_1$ and $f_1'$ and that the half cycle being completed by pistons 302 and 304 is past its midpoint, point A on the bottom half of the ellipse of FIG. 10, for instance, the combusted gases contained in combustion chamber 301 are being exhausted. The combustion process that just took place in combustion chamber 303 is completed, both inlet valves are closed and both outlet valves are open. Point B is then reached in FIG. 10 and outlet valve 316 closes. The gas trapped between pistons 302 and 304 acts as a buffer and a compression spring to force both pistons to bounce back. If the motions of the two pistons are symmetrical with respect to the axis of symmetry that joins the centerlines of all valves in FIG. 48, the two torsion bars and bumpers 343 are not used. However, if the piston motions are not symmetrical, one torsion bar and then one bumper (if needed) come into play, to act on that piston which is ahead of the other, to correct and restore the symmetry of both piston motions. Ideally, point O of FIG. 10 is reached. At point O, a new half cycle is initiated. The combusted gases contained in combustion chamber 303 are in the full process of being exhausted and both inlet valves are still closed. At point C, the appropriate roller is lifted by cam 360 and inlet valve 312 opens. Compressed air is admitted in combustion chamber 301, then at point D, the appropriate microswitch is contacted by cam 364 and fuel injection is initiated. At point E of FIG. 10, cam 365 makes contact with the appropriate ignition microswitch and combustion in combustion chamber 301 is initiated. It is completed by the time point F is reached. At point G, the short track of cam 361 pushes its appropriate roller up and outlet valve 316 opens. Outlet valve 318 is still open, it closes only when point H is reached. Then point 1 is reached, where a process of piston stopping and bouncing back, similar to that described earlier, takes place. A similar cycle then starts for combustion chamber 303, which needs no further description. It is the exact image of that which is being described for combustion chamber 301. Past point 1, the combusted gases contained in combustion chamber 301, which has just gone through its largest volume expansion, are continuously exhausted through outlet valve 316 which is still open, as its corresponding roller is now on the long track of cam 361. At point 1, assuming that roller 379 of FIG. 53 is the appropriate roller, roller 379 shifted from the position shown in solid lines (contact with the outer track or short track) to the position shown in phantom lines (contact with the inner track or long track). This is accomplished automatically at point X of FIG. 60 which corresponds to point 1 of FIG. 10. Roller 379 indentations 384 exert a torque on roller 379 much larger than that due to the friction of the journal bearing that is located between roller 379 and journal sleeve 381, which means that roller 379 reverses its rotation at point X. However, the journal bearing requires a torque to rotate larger than that generated by ball bearing 382, which becomes unlocked because of the orientation of helical grooves 383 on shaft 380. Journal sleeve 381 leaves its contact with flange 374' and travels in the right direction until it is stopped by flange 380', where roller 379 is now in contact with the inner track of cam 362. Indentations 385 on both tracks of cam 362 surface are in line and become continuous from track to track in the vicinity of point X where the track switchover occurs.

At this point, the roller that had been riding inlet valve cam 360 also switches over, but at a point Y that corresponds to a location on cam 360 where the protrusion above flange 356 surface is a low point. The reversal process of the roller position on its own support shaft is however the same as described above for roller 379. Therefore, when piston 302 reaches a position where cam 360 (point Z of FIG. 48) would otherwise push its appropriate roller up, that roller is riding on a parallel track which does not have the protrusion 360 shown in FIG. 48. Microswitch 425 of FIG. 59 therefore does not close and the action of microswitches 368 and 369 is biased, thereby rendered ineffective: fuel injection and ignition do not take place during this phase. Pistons 302 finally reaches point A where the cycle and its description originated.

During this cycle, gear 400 and shaft 401 reversed their direction of rotation twice. Their angular velocities varied as shown by the curve of FIG. 56, from point P to point Q. Assuming that shaft 401 was then moving counterclockwise, when viewed in the direction of arrow f, shown in FIG. 57, given the inclination of helical grooves 414, sleeve 412 was then at its extreme left position and gear 410 was engaged. Shaft 420 then moved counterclockwise when viewed the same way. Ratchet teeth 417 of FIG. 58 meshed with teeth 419 and sleeve 412 also turned counterclockwise. Gear train 405-406-407 also turned CCW and gear 407 meshed with gear 421, thereby driving shaft 420 clockwise (direction reversal occurred). At point $\Omega$ of FIG. 56, where $\omega$ became O to change to $-\omega$ (point O of FIG. 10 and point X of FIG. 48), sleeve 412 disengaged from gear 410 and the motion of shaft 420, combined with the reversal of rotation direction of shaft 401, through the action of helical grooves 414 on balls such as 415, then caused ratchet teeth 418 of sleeve 412 to contact and engage teeth 416 of gear 406. Internal gear 410 could then free wheel in a reversed direction, gear train 405-406-407 could keep turning in its previous direction and shaft 420 also kept rotating clockwise, although shaft 401 had then reversed its direction of rotation.

FIG. 58 also shows the forces that are acting on sleeve 412 when teeth 416 and 418 are engaged. The forces exerted by balls such as 415 are shown as exerted at central point O. The resisting forces exerted on teeth 418 by teeth 416, and which result from the resisting torque exerted by shaft 420, are shown applied at point O', in line with point O and located at the apex of teeth 416. Assuming that the proper corections have been made for the different values of the radii at which the torques are being applied, the axial component $F_a$ of force F exerted by balls 415 on shaft 401 must always be larger than the axial component $F_a'$ of force F' exerted by teeth 416 on teeth 418 of sleeve 412, so that sleeve 412 remains engaged. The tangential components $F_t$ and $F_t'$ of forces F and F' respectively are equal, under steady state conditions and correspond to the driving torque of shaft 401 and the resisting torque of shaft 420. If $\alpha$ is the angle between helical grooves 414 and shaft 401 centerline, and if $\beta$ is the angle between the steep side of teeth 416 and shaft 401 centerline and because $F_a$ must be larger than $F_a'$, with the radius ratio $\kappa$ correction, the following condition must be satisfied: $\tan \alpha / \tan \beta > 1/\kappa$; where $\kappa$ is approximately 5/3 in the case of FIG. 57. $\alpha$ and $\beta$ being relatively small angles, if $\alpha > 0.6\beta$, the condition mentioned above is satisfied. $\alpha$ should be as small as possible to minimize the shuttling time of sleeve 412 and $\beta$ should be large enough to facilitate the disengagement of teeth 416 and 417 from the teeth of shuttling valve 412. Values of α and β of 6 to 20 degrees would probably be satisfactory, as long as α is at least equal to β or slightly larger, for extra safety. The width of helical grooves 414 are much smaller than the diameter d of balls 415, although equal in the schematic of FIG. 58. The need for axially oriented grooves, located on the internal surface of sleeve 412 and in which balls 415 ride and are guided, is created by the need to transmit shaft 401 torque to sleeve 412.

The operation of the heat exchanger of FIGS. 61 and 62 is very straightforward and needs no further discussion. The arrows shown in FIG. 62 indicate that the compressed air and the combusted gas flow in the same direction inside the heat exchamger. This needs not be so. Air and gas could just as easily be made to flow in opposite directions. Considerations of design, fabrication and operation efficiency would dictate which approach is most desirable. However, in any case, the structural flanges 460 and 461 have a thermal insulating layer on their external faces, although not shown in FIG. 61 for the sake of simplicity.

In this double-piston power plant system, the linkages and connections between the pistons, the valves and the fuel injectors are preset and always determined. This leaves no direct access to air admission and fuel injection controls by the operator in order to regulate the power level. The direct access to air admission means would be too cumbersome and mechanically complex. However, the access to fuel injection means is easy and straightforward. The amount of fuel injected each cycle, assuming that the injector characteristics are those of a fixed orifice, depends upon the duration of the fuel injection and the fuel pressure in the injector supply line. Either one of these two parameters can be used, or combination thereof. To facilitate the combustion process initiation and its sustenance, the fuel jet in the combustion chamber must penetrate as far and spread as widely as possible. The fuel itself must be divided into a mist of droplets as small as possible. High fuel pressures are needed to obtain such fuel injection characteristics. Because the volume of fuel injected per unit of time through a fixed orifice varies roughly as the square root of the pressure differential across the orifice, the pressure range needed to cover adequately the low and high fuel setting requirements (ratio larger than 10) would be too large. This would mean pressure levels too low for low fuel settings, because the highest pressure levels could hardly exceed 3000 psi. The low pressure levels would have to be like 30 psi (factor of 1/100). Such low pressures would not provide satisfactory fuel jet characteristics. Some help can be provided by using variable orifice injectors. However, varying the duration of the fuel injection period, in addition to and in conjunction with the use of the two means above, is far superior technically.

Adjusting or controlling the pressure in the injector fuel supply line is simple and state-of-the-art and need not be discussed here. The means of varying the injector effective orifice size, either by manual command or directly by means of the fuel pressure, as is well known in the art. The combination of both means might be adequate to cover the range of fuel amounts needed per cycle. Nevertheless, varying the duration of the injection phase is discussed. This is easily achieved by monitoring the electrical signal generated by the microswitch that controls fuel injection. The signal is cut short, as required, when smaller amounts of fuel are required. The timing device shown in FIG. 63 is used. Each piston drives such a device, one for each combustion chamber. Each device is connected to its corresponding piston by a shaft 490 directly linked to accessory drive shaft 401 of that piston. Shaft 490 drives a drum 491 on which electrical contact surfaces 492 and 493 are mounted. Another sliding surface 494 can move transversally in order to establish electrical contact when the three surfaces are in contact. When contact between 492 and 494 is not made, the signal from the microswitch is interrupted. Sliding surface 494 is under the operator's control by means of linkage 495. One electrical line from each microswitch is connected on line 496. Each line 497 is in turn connected to master control 140. When sliding surface 494 is in a position such as a in FIG. 63, the signal goes through. If 494 is in a position such as b, the signal is stopped (no fuel injection). The right side of surface 492 is helically shaped so that the distance between this helical side and the left side of surface 493 varies (where sliding surface 494 is located). Because surface 494 cannot rotate around drum 491, when drum 491 rotates (directions of arrow f), in accord with the piston motion, it is easily seen that the transversal (or longitudinal) position of sliding surface 494 determines the fuel injection duration. Except for surfaces 492 and 493, the rest of drum 491 surface does not conduct electricity. The straight line boundaries of surfaces 492 and 493 along the generatrices of the cylinder of drum 491 surface correspond to the start and the end of the fuel injection cam travel. One can now easily understand how a motion of sliding surface 494 in the directions of arrow f' directly controls the duration of the fuel injection, thereby the amount of fuel injected per cycle. It is of course understood also that the fuel is then supplied to that injector only while the microswitch signal is permitted to pass through.

To start the double-piston power plant, a starting sequence similar to that described earlier for the single piston system is used. By means of the two accessory shafts, such as 401, the two pistons are brought to either their extreme right or their extreme left position, in FIG. 48, depending upon where the pistons are located at the time of the initiation of the starting cycle. Brakes applied to these shafts keep pistons 302 and 304 still in that extreme position selected. The air inlet and gas outlet valves that control that combustion chamber are closed, as in the case of the previous power plant arrangement discussed. Engine 1 is cranked up by the starter and compressed air accumulates and is pressurized in the heat exchanger. When the air pressure is high enough, the two pistons are released and the first cycle previously discussed then takes place. The operator indirectly sets the power level selected by means of fuel pressure and linkage 495. Its motion (or setting) and the fuel pressure are in fact both coordinated, monitored and dictated by master control 140 which is the only component that the operator actually directly controls. To stop the power plant, both fuel injection and spark plug activation are shut off. The pistons soon stop their motions and are free to come to rest at any location between the bumpers (shock absorbing means) that limit their displacements.

The combustion member of the external engine of the present invention can accommodate various fuels and methods of fuel supply. Fuel injection can readily be used, and can be used in combination with glow plugs or high energy spark plugs and glow plugs. Fuel can also be injected in the air intake duct at the entrance to the compression chamber or in the compressed air duct leading into the combustion member from the heat exchanger. Fuel injection in the air intake duct should improve the compression efficiency of the air compression means. In the case of the two-stage compressor arrangement, the fuel could best be injected in the compressed air duct connecting the first and second stages.

The use of graphite/carbon or graphite/graphite 3-D reinforced materials for both the static and moving parts of the air compression and gas expansion components lowers the cooling and/or lubrication requirement and simplifies thermal expansion accommodation. Because of the small coefficient of thermal expansion, high heat capacity and good thermal conductivity of such materials, sealing problems could thereby be minimized. Strength of these materials increases with temperature up to a point that happens to be close to that where the strength characteristics peak. The use of graphite/carbon matrices and graphite/carbon reinforced fibers for the engine rotor, the vanes and housing could easily permit sweat cooling and/or lubrication of these parts. With the use of such materials, the combustion member could also operate at temperatures higher those acceptable with steel alloy components. Because of the absence of mechanical connections between the combustion member and the engine proper, except for air and gas ducts, and mounting supports, the materials used for each member can then be of quite different nature, i.e.: Carbon/Graphite for the combustion member and conventional metals for the heat exchanger and some parts of the power producing means, should this combination of materials prove to be the most judicious. A lifetime expectancy of the external combustion engine much longer than that of conventional piston engines could be the result.

Although the external combustion engine of the present invention is driven in a manner similar to that of a gas turbine, the amount of total gases processed and ejected per unit of power and unit of time is still much lower than that of a gas turbine (because of much lower gas velocities), no high pitch whining sounds are anticipated from the gas exhaust, or air intake. The vibration/low-frequency-noise levels should be lower than those of piston engines generating the same power. It should be emphasized that the gas pressures do not exert forces on sliding components such as in the case of the piston/connectingrod/crankshaft arrangement of piston engines. This greatly minimizes the lubrication, sealing and wear problems of parts operating at high temperatures and sliding velocities.

The gas mixture burns under conditions of a variable expanding volume and of increasing pressure, much like in a combination of Otto Cycle and Diesel Cycle Engines (first improvement contribution). The high pressure gases exhaust from the combustion member continuously at pressure levels that do not vary between large extremes, their volume does, however, to provide the range of power levels required. The amount of hot gases admitted into the expansion chamber is expanded to quasi atmospheric pressure and exhausts to the ambient atmosphere at low velocity, with very little pressure drop and energy loss. This is possible because the air compression and the combusted gas expansion chambers do not switch functions as they do in piston engines. They can then be volumetrically different in a manner akin to that of gas turbines (second improvement contribution). The combination and compounding of these two contributions constitute a significant potential improvement in the thermodynamic efficiency of the external combustion engine of the present invention. The easy incorporation of a heat exchanger further enhances this efficiency improvement.

The possibility of burning fuel more slowly and completely, especially during abrupt and large power increases, reduces the fuel consumption, the peak combustion temperatures and also the amount of pollutants created, and further increases the combustion efficiency. Non-fossil fuels, inexpensive and strategically less critical, less volatile and easier to store and handle, could then be used extensively, thereby reducing the incident pollution caused by the refining, storage and transportation of more volatile fuels such as gasoline. The savings in the cost pollution control (vehicles and fuel handling) themselves are staggering. The cold weather starting of the external combustion engine should also be much easier than that of piston engines, more like that of gas turbines.

The volume and weight per unit of power should be smaller because the bulky crankcase is eliminated. The geometrical adaptability to confined spaces of the external combustion engine is ideal because the physical relationship of its main members is not fixed, but very flexible. Easier and less costly maintenance should result.

It will be noted that there is a minimum number of moving parts, that they are not interconnected and subjected to the shocks and vibrations so typical of gasoline and Diesel engines, and that they are not directly connected to the power shaft. None of these moving parts experiences the high velocities typical of gas turbine engines. Admission, exhaust and ignition functions relate simply and directly to maximize efficiency and reliability, and to minimize weight, space and cost.

Having thus described my invention, I claim:

1. An external combustion engine comprising:
a combustion member including a sleeve having an end closure and an ignition means at each end thereof, inlet and outlet valving means for introducing compressed air and exhausting combusted gases through each end closure, and a free piston mounted in the sleeve for sliding reciprocating axial motion between the end closures and defining a combustion chamber between each end closure and a corresponding end of the piston;

means for compressing the air and introducing the compressed air in the combustion chambers through the inlet valving means;

means for receiving and expanding the exhausted combusted gases to drive the air compressing means and a power delivery member;

means for introducing fuel for burning in the combustion chambers;

means for detecting the axial location of the piston as it reciprocates and for generating hydraulic signals representative of the piston location;

means for controlling the inlet and outlet valving means in response to the hydraulic signals; and wherein the combustion member further includes a stem connected to and extending axially from each end of the piston and a combustion member appendage connected to each end of the sleeve and extending axially therefrom for receiving and guiding a corresponding stem, and structural means in the piston stem and combustion member appendage for imparting a predetermined guided rotational motion to the piston as it reciprocates axially.

2. An external combustion engine according to claim 1 wherein the structural means for imparting the predetermined guided rotational motion includes elliptically shaped grooves formed in the combustion member appendages and guide elements affixed to the stems and engaged in the grooves.

3. An external combustion engine according to claim 2 wherein the means for guiding the free piston includes:
   means for sensing specific and predetermined positions of the free piston along its axial reciprocating motion;
   means for sensing specific and set angular positions of the free piston during its angular oscillatory motion;
   means for interrelating the axial and angular positions of the free piston at all times singularly in a preset manner;
   means for generating specific hydraulic signals according to the free piston axial and angular positions; and
   means for identifying the free piston travel direction.

4. An external combustion engine according to claim 3 wherein the means for sensing and monitoring the axial and the angular locations and positions of the free piston includes:
   means for introducing lubricating and cooling fluid inside the free piston;
   means for utilizing the lubricating and cooling fluid as hydraulic fluid for sensing and monitoring the free piston axial and angular positions; and
   means for minimizing the side loads exerted by the free piston on its guiding sleeve.

5. An external combustion engine according to claim 4 wherein the interface between the sleeve and the free piston is lubricated and cooled by the hydraulic fluid to minimize part wear and gas leakage between the two combustion chambers.

6. An external combustion engine according to claim 2 wherein the axial location and the angular position of the free piston inside the guiding sleeve are preset to prevent any risk of physical contact between the free piston and the sleeve end closure internal surfaces.

7. An external combustion engine according to claim 2 wherein the elliptically shaped grooves used to guide the free piston guiding stems are located on the external surface of an internal sleeve affixed to the outer end of the appendages of the free piston guiding sleeve.

8. An external combustion engine according to claim 2 wherein the air inlet and gas outlet valving means are actuated directly and only by means of the hydraulic signals representative of the piston location.

9. An external combustion engine according to claim 3 wherein the means for controlling the inlet and outlet valving means in response to the hydraulic signals includes:
   means for receiving hydraulic fluid at high pressure;
   means for returning the hydraulic fluid at low pressure;
   means for creating a pressure drop between the high pressure and the low pressure levels;
   means for connecting the low and high pressure sides of the pressure drop creating means to the space inside means for actuating the air inlet and gas outlet valves, said valves responding thereby directly to the hydraulic fluid pressure in the connection means.

10. An external combustion engine according to claim 9 wherein the means for actuating the compressed air inlet and gas outlet valving means are bellows receiving directly the hydraulic fluid transmitting the hydraulic signals.

11. An external combustion engine according to claim 1 wherein the combustion member and the power delivery member are mechanically isolated but operationally connected and only by compressible fluids, thereby enabling the regimes of the power delivery member and of the combustion member to be independent, different and allowed to vary independently and continuously as the power level and the torque requirements of the engine vary, under all engine operating conditions.

12. An external combustion engine according to claim 11 wherein the amount of power delivered by the power delivery member is adjusted by controlling simultaneously the amount of fuel introduced for burning in the combustion member and the duration of the opening of the compressed air inlet valving means.

13. An external combustion engine according to claim 12 wherein the simultaneous adjusting of the amounts of compressed air and of fuel introduced in the combustion member independently of the regime of the power delivery member enables the combustion member to minimize the amount of pollutants resulting from the fuel burning therein.

* * * * *